United States Patent [19]

Tezuka et al.

[11] Patent Number: 5,764,911
[45] Date of Patent: Jun. 9, 1998

[54] MANAGEMENT SYSTEM FOR UPDATING NETWORK MANAGED BY PHYSICAL MANAGER TO MATCH CHANGED RELATION BETWEEN LOGICAL OBJECTS IN CONFORMITY WITH CHANGED CONTENT NOTIFIED BY LOGICAL MANAGER

[75] Inventors: Satoru Tezuka; Shigeru Miyake, both of Yokohama; Kenji Kawaguchi, Chigasaki; Satoshi Miyazaki, Yamato; Kenji Kawakita, Urawa; Takashi Kagei, Yokohama; Akira Mineo, Sagamihara; Keizo Mizuguchi, Kanagawa-ken, all of Japan

[73] Assignee: Hitachi, Ltd., Tokyo, Japan

[21] Appl. No.: 799,759

[22] Filed: Feb. 12, 1997

[30] Foreign Application Priority Data

Feb. 13, 1996 [JP] Japan .................................. 8-025413

[51] Int. Cl.[6] .................................................. G06F 13/00
[52] U.S. Cl. .................................................. 395/200.53
[58] Field of Search .......................... 395/200.53, 200.54, 395/200.5, 200.3, 200.31, 200.32; 370/252, 254, 255

[56] References Cited

U.S. PATENT DOCUMENTS 5,295,139  3/1994  Palmer et al. ........................ 370/255
5,295,244  3/1994  Dev et al. ........................... 345/357
5,559,955  9/1996  Dev et al. ........................ 395/182.02

OTHER PUBLICATIONS

"The Distributed Management Choice", by Thomas, Larry, LAN Technology, V8, N4, p. 53(10), Apr. 1992.

*Primary Examiner*—Moustafa M. Meky
*Attorney, Agent, or Firm*—Antonelli, Terry, Stout & Kraus, LLP

[57] ABSTRACT

A system is provided for building, operating, and managing a virtual network which integrates the configuration, the operation, and the management of plural information devices connected to a network. The system includes agents for operating, and managing information devices in the respective devices, a physical manager for building, operating, and managing the information devices, and a logical manager for logically building, operating, and managing the information devices. The agent operates to control the settings and the change of the information device in which the agent is mounted and communicates the information with the physical manager. The physical manager operates to manage the agent of each information device and communicates the information with a user and the logical manager. The logical manager operates to build, operate, and manage the directory services, the users, and so forth and, when these directories and user are newly set or changed, to communicate the information about the new settings and the change with the physical manager.

7 Claims, 25 Drawing Sheets

FIG. 24A

| LOGICAL OBJECT ID (2401) | GROUP NAME (2402) | PARENT OBJECT ID (2403) |
|---|---|---|
| C | 4 DEPT. | 405U |
| D | 5 DEPT. | 405U |
| ⋮ | ⋮ | ⋮ |

FIG. 24B

| PHYSICAL OBJECT ID (2411) | ATTRIBUTE (2412) | LOGICAL OBJECT ID (2413) |
|---|---|---|
| NOTE 1 | CLIENT | B |
| ATM 1 | ATM | D |
| DESKTOP 1 | CLIENT | A |
| ⋮ | ⋮ | ⋮ |

FIG. 24C

| GROUP NAME (2421) | VIRTUAL NETWORK NAME (2422) |
|---|---|
| 4 DEPT. | 4 DEPT. |
| 5 DEPT. | 5 DEPT. |
| ⋮ | ⋮ |

FIG. 25

| PHYSICAL OBJECT ID 2501 | ATTRIBUTE 2502 | VIRTUAL NETWORK NAME 2503 | LOCATION 2504 | ADDRESS 2505 |
|---|---|---|---|---|
| NOTE 1 | CLIENT | 4 DEPT. | ... | ... |
| ATM 1 | ATM | 5 DEPT. | ... | ... |
| DESKTOP 1 | CLIENT | 5 DEPT. | ... | ... |
| SWITCH 1 | SWT | 4 DEPT. | ... | ... |
| ... | ... | | ... | ... |

MANAGEMENT SYSTEM FOR UPDATING NETWORK MANAGED BY PHYSICAL MANAGER TO MATCH CHANGED RELATION BETWEEN LOGICAL OBJECTS IN CONFORMITY WITH CHANGED CONTENT NOTIFIED BY LOGICAL MANAGER

BACKGROUND OF THE INVENTION

1. Field of the Invention

The present invention relates to a technique of assisting in building, operating and managing a network, and more particularly to the assisting technique of facilitating the building, operation and management of a switching network containing the conventional shared network.

2. Description of the Related Art

In order to build, operate, and manage a computer network system having plural information devices, it is necessary to build, operate, and manage the network system in addition to the building, operation, and management of hardware devices and relations among the hardware devices. The concrete objects to be built, operated, and managed for that purpose are physical objects and logical objects, the former containing information devices and hardware devices composing the network and the latter containing users of the network, and further a directory service representing a system in a logical hierarchical manner for more easily understanding management of those objects.

Conventionally, for all logical objects, the building, operation and management of those objects are executed on the directory service, while for the physical objects, they have to be selectively executed on the directory service level or by the hardware device itself.

For example, for changing the company organization, it is necessary to change the directory service as well as the logical and the physical objects. Further, travel of the hardware devices is also necessary. In association with these changes, the set values such as network addresses are required to be changed. This operation needs to be actually done in site. This results in greatly increasing the burden in building, operating and managing the network system and making the setting operation obviously difficult.

On the other hand, the technique described in the article "Rush at Virtual LAN" of Nikkei Communications issued on 21 Nov., 1994 concerns with a virtual LAN for arbitrarily configuring a LAN without having to consider a physical configuration of a switching network.

For changing the system as mentioned above, however, the Article reports that the technique can reduce the burden in re-setting the network address in association with travel of an actual hardware device but it does not report that the technique can perform change of the overall network system containing changes of the physical objects, the logical objects and the directory service.

SUMMARY OF THE INVENTION

It is an object of the present invention to provide a system for operating and managing a virtual network which system automatically realizes a network configuration most fitted for automatically changing a system in association with change of logical objects and physical objects on a directory service with no restriction by the physical configuration though the directory service, the logical object, and the physical objects are conventionally built, operated and managed in a different manner from the hardware devices, for coping with the change of a company organization, for example.

It is another object of the present invention to provide a system for operating and managing a virtual network which system enables to assist in not only a switching network but the traditional shared network.

In carrying out the objects, according to an aspect of the invention, a system for operating and managing a virtual system, for automatically realizing the most appropriate network configuration to change of the logical and the physical objects on the directory service, includes a logical manager for building, operating, and managing the directory service and the logical objects, a physical manager for building, operating, and managing the physical objects such as information devices and hardware devices configuring the network, and an agent located on each of those physical objects. The logical manager has a unit for setting or changing the directory service and the logical object, a communicating unit for reporting the set or changed information to the physical object, and another communicating unit for receiving information from the physical object. The physical object has a communicating unit for receiving information from the logical object and another communicating unit for reporting information to the logical object. And the agent has a communicating unit for receiving information from the physical object and a unit for setting or changing the physical object on the information.

In the system for operating and managing a virtual network, the logical manager reports the information to the physical manager if the directory service or the logical object needs to be set or changed. Then, the physical manager reports the information for the received information to the agent for setting or changing the physical object having the agent mounted thereto.

On the other hand, if the physical object needs to be set or changed, the agent reports the information thereabout to the physical manager. The physical manager reports the information for the received information to the logical manager. Then, the logical manager sets or changes the directory service or the logical object.

This operation therefore makes it possible to automatically realize the most appropriate network configuration to the change of the logical object and the physical object on the directory service with no restriction by the physical configuration.

BRIEF DESCRIPTION OF THE DRAWINGS

FIGS. 24A, 24B, and 24C are tables showing table structures contained in the logical manager according to the embodiment of the present invention; and FIG. 25 is a table showing a table structure contained in the physical manager according to the embodiment of the present invention.

DESCRIPTION OF THE PREFERRED EMBODIMENTS

Hereafter, the description will be oriented to a system for building, operating, and managing a virtual network according to an embodiment of the present invention.

(1) Overall Configuration

Figure 1:
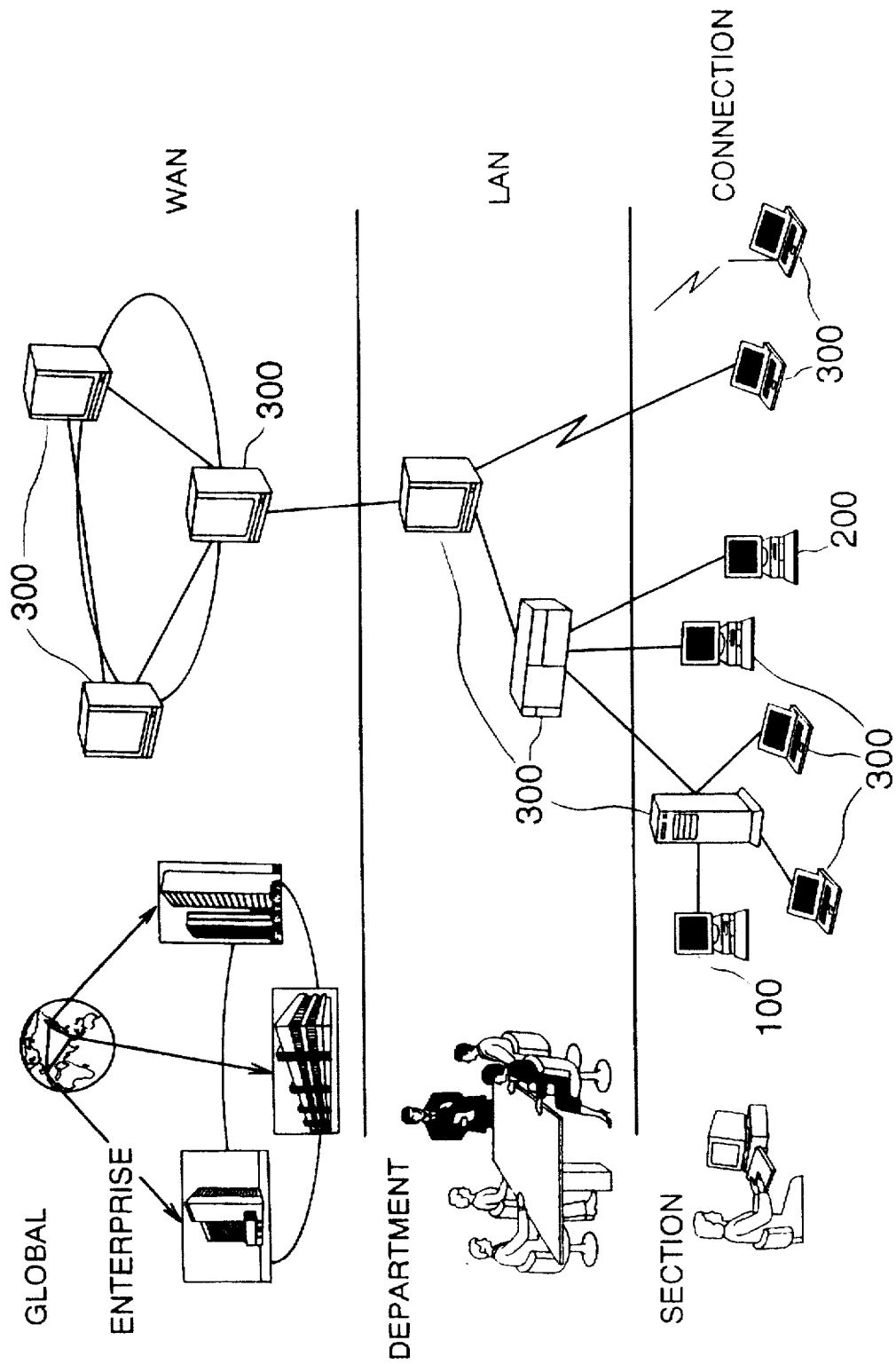
FIG. 1 is an illustration showing an overall configuration of a system according to an embodiment of the present invention.

FIG. 1 shows a configuration of the system for building, operating, and managing a virtual network according to this embodiment.

As shown in FIG. 1, this system covers any kind of network ranging from a global network to a local one. This embodiment will be described with an example of a switching network containing the traditional shared one. The present system includes a logical manager 100 for building, operating, and managing a directory service and logical objects, a physical manager 200 for building, operating, and managing physical objects such as hardware devices configuring the network, and an agent 300 located on each of the physical objects.

Figure 2:
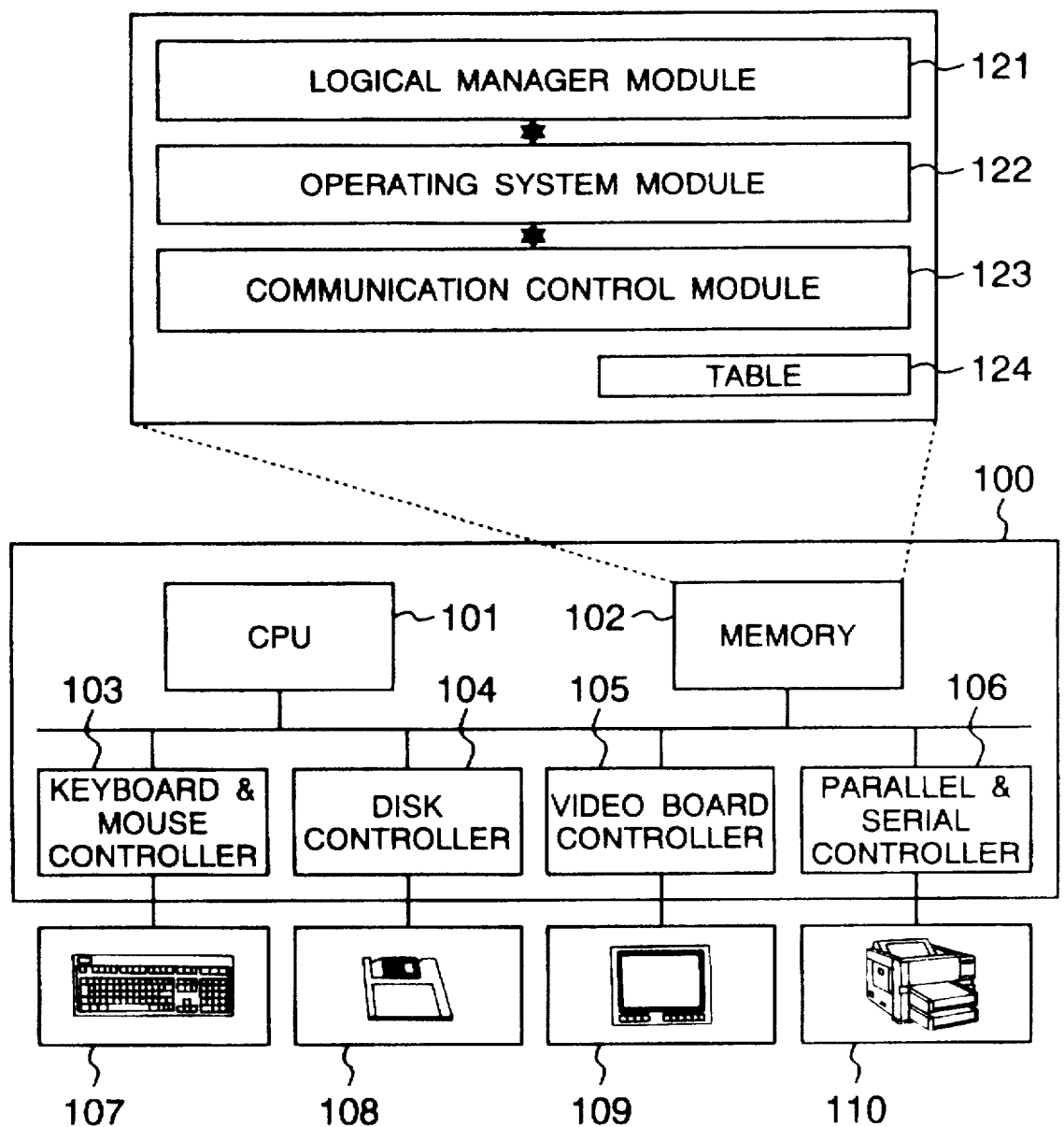
FIG. 2 is a block diagram showing an arrangement of a logical manager according to the embodiment of the present invention.

(2) Logical Manager FIG. 2 shows an arrangement of the logical manager 100.

As shown in FIG. 2, from a view of hardware, the logical manager 100 is composed of a normal computer and its associated external devices. The normal computer includes controllers 103 to 106 for managing an input signal between the computer itself and the external devices, a CPU 101 and a memory 102. The associated external devices include an input unit 107 such as a keyboard or a mouse, an external storage unit 108 such as a floppy disk drive or a harddisk drive, a display unit 109, and a printer 110. The logical manager 100 also includes a network interface and is connected to the network through the network interface. The logical manager 100 may be connected to any portion of the network.

The memory 102 includes a logical manager module 121, an operating system module 122, and a communication control module 123, which are programs executed under the control of the CPU 101. The memory also includes a table 124 for managing the logical object.

FIGS. 24A, 24B and 24C show the arrangements of the table 124.

FIG. 24A is a correspondence table among a logical object ID (Identifier) 2401, a group name 2404 to which the logical object belongs, and a logical object ID 2403 located as a parent in a hierarchical structure. All logical objects have their own IDs in the system and are registered in the correspondence table.

FIG. 24B is a correspondence table between a physical object which is a device located in a network and a logical object for each device. All devices connected in the network have their own IDs in the system and registered in this correspondence table. This correspondence table has a physical object ID 2411, an attribute 2412 of each device (such as an ATM, a Printer, a Client or a rooter), and a logical object ID 2413 for the device with the ID. This correspondence table may be contained in the physical manager 200.

FIG. 24C is a correspondence table between a group name 2421 and a virtual network name 2422.

Figure 5:
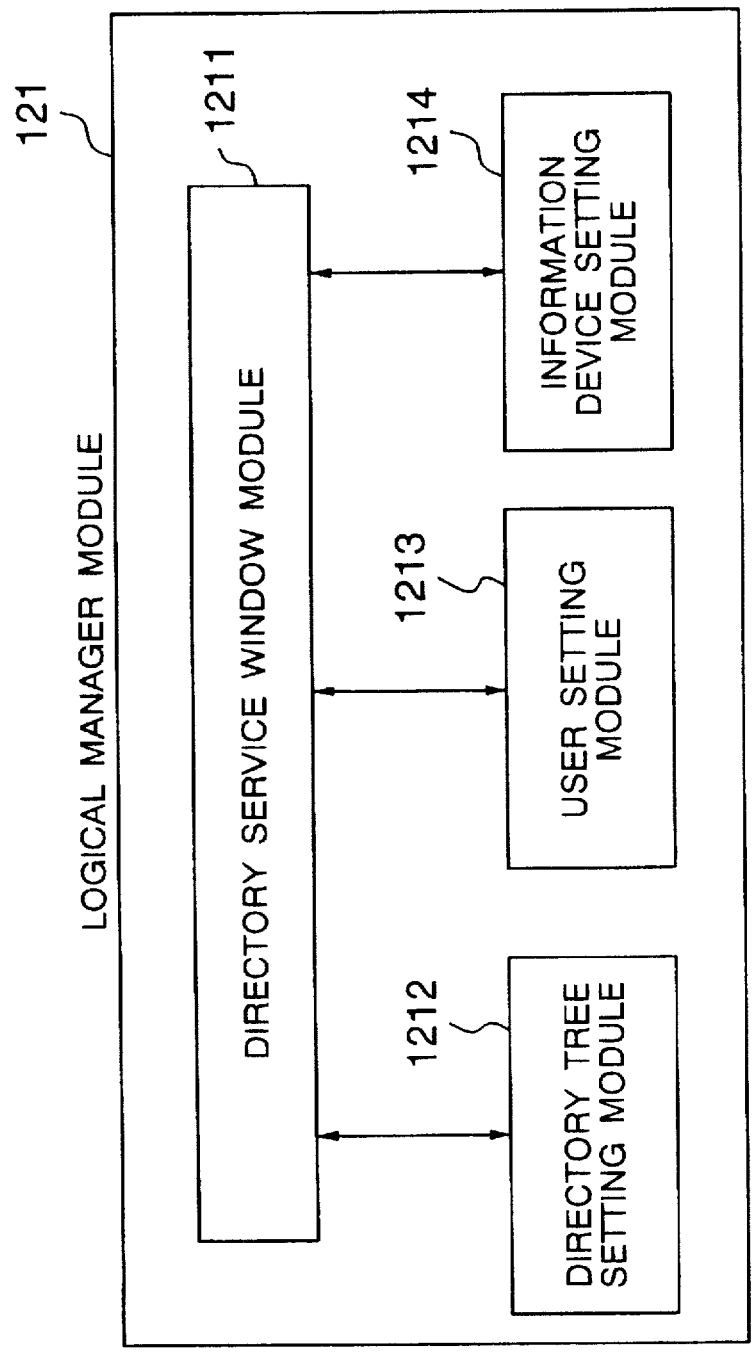
FIG. 5 is a block diagram showing an arrangement of a logical manager module according to the embodiment of the present invention.

As shown in FIG. 5, the logical manager module 121 includes a directory service window module 1211, a directory tree setting module 1212, a user setting module 1213, and an information device setting module 1214. One or more modules may be added to the logical manager module 121 if necessary.

The logical manager module 121 is started by an operator. The directory service window module 1211 is created by a directory service (for example, NDS manufactured by Novell, Ltd.) in accordance with the ITU-T X .500 series and operates to display as a directory tree the relation among the logical objects on the display unit, for providing a user interface for changing the relation or placing a new object. Further, this module 1211 displays the connecting relation among the physical objects on the virtual network.

If an operator registers a new user or changes an existing user, the user setting module 1213 performs a process of adding and deleting a record and changing a content of an existing record in the table about the logical objects as shown in FIGS. 24A and 24B. Further, this module 1213 reports to the physical manager 200 the corresponding object ID, and the changed or registered content.

If an operator registers a new object, that is, a new information device or change an existing object, the information device setting module performs the process of adding and deleting a record and changing the content of an existing record in the table of the physical object ID shown in FIG. 24B. Further, this module reports to the physical manager 200 the physical object ID and the changed or registered contents.

If an operator creates a new directory tree or changes an existing directory tree, the directory tree setting module 1212 requests the user setting module 1213 and/or the information device setting module 1214 to do the process.

Like the normal data transfer, the transfer of information between the logical manager 100 and the physical manager 200 is executed under the control of a protocol used in the network.

Figure 3:
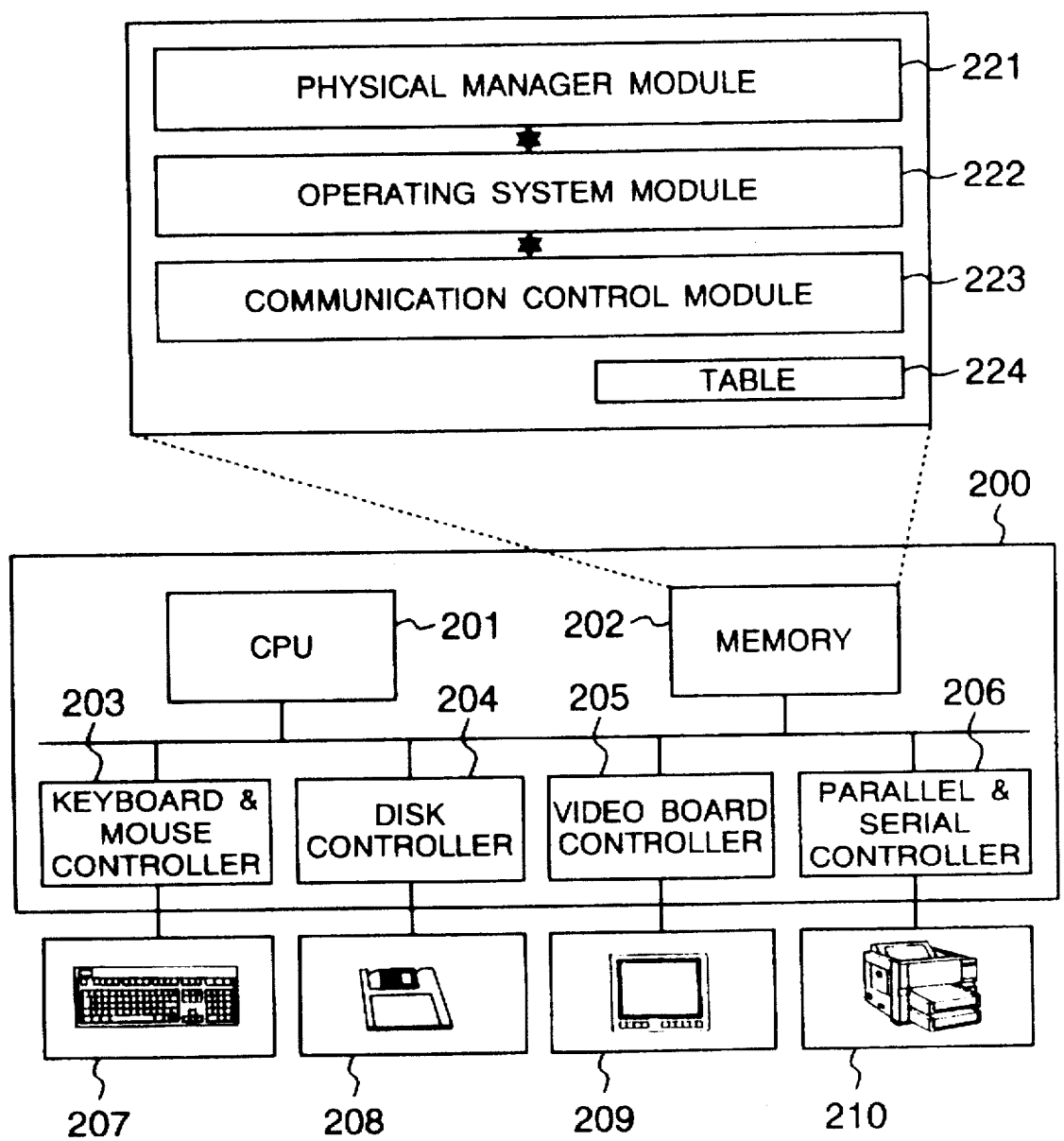
FIG. 3 is a block diagram showing an arrangement of a physical manager according to the embodiment of the present invention.

(3) Physical Manager Likewise. FIG. 3 shows an arrangement of the physical manager 200.

As shown in FIG. 3, from a view of hardware, the physical manager 200 is composed of a normal computer and its associated external devices. The computer has controllers 203 to 206 for controlling an input signal between the external devices and the computer itself, a CPU 201, and a memory 202. The external devices have an input unit 207 such as a keyboard and a mouse, an external storage unit 208 such as a floppy disk drive or a harddisk drive, a display unit 209, and a printer 210. The physical manager 200 has a network interface as well, through which the manager 200 is connected to the network. The manager 200 may be connected to any portion of the network. The manager 200 may share the same device with the logical manager 100.

The memory 202 has a physical manager module 221, an operating system module 222, and a communication control module 223, which are all executed under the control of the CPU 201. Moreover, the memory has a table 224 for managing the physical object.

FIG. 25 shows an arrangement of the table 224.

FIG. 25 is a table listing the physical objects of the network, that is, the devices connected in the network. All devices in the network have their own physical objects ID and registered in this table. This table contains a physical object ID 2501, an attribute 2502 of the device with the physical object ID, a virtual network name 2503 to which the physical object belongs, a location item 2504 representing a location of the object, and an address 2505 on the network such as an IP address. This table 224 may contain additional items according to the type and the configuration of the network.

Figure 6:
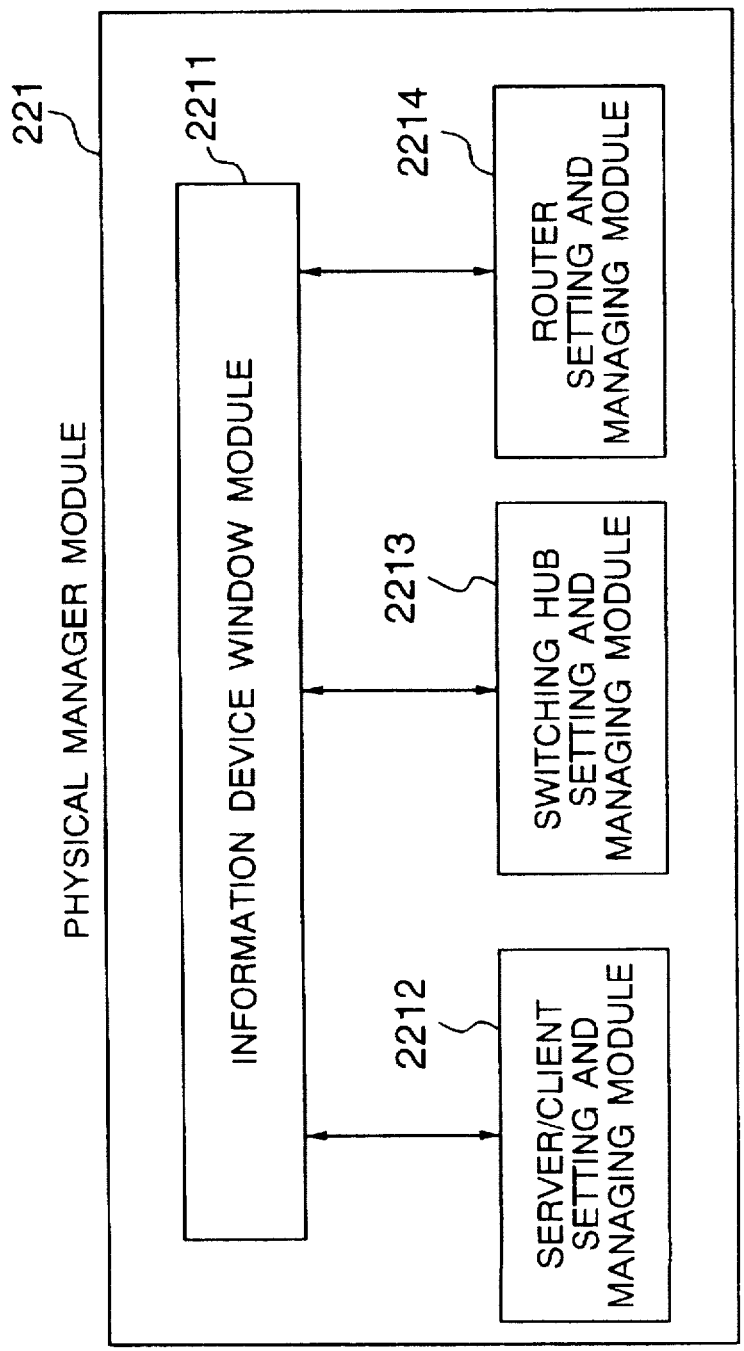
FIG. 6 is a block diagram showing an arrangement of a physical manager module according to the embodiment of the present invention.

As shown in FIG. 6, the physical manager module 221 includes an information device window module 2211, a server/client setting and managing module 2212, a switching hub setting and managing module 2213, and a router setting and managing module 2214. Further, one or more modules may be added to the module 221 if necessary.

The physical manager module 221 is started by an operator or a notice given by the logical manager or the agent. The information device window module 2211 displays on the display unit the physical and logical connecting relations among the information devices and provides a user interface used for changing the connection or adding a new device.

The physical manager module 221 executes the corresponding process to an attribute of an information device to be changed or newly placed by the operator or the notice given by the logical manager or the agent. If the information device is a server or a client, the server/client setting and managing module 2212 operates to update or add a record of the table 224 (see FIG. 25). If it is a switching hub, the switching hub setting and managing module 2213 operates to do the same operation. If it is a router, the router setting and managing module 2214 operates to do the same operation. In response to a request for the process given by any other than the agent, the physical manager module 221 notifies the agent 300 located in the associated information device of the change of the content and requests the agent 300 to do the changing process.

Like the normal data transfer, the transfer of the information between the physical manager 200 and the agent 300 is executed under the control of the protocol used in the network.

(4) Agent

Figure 4:
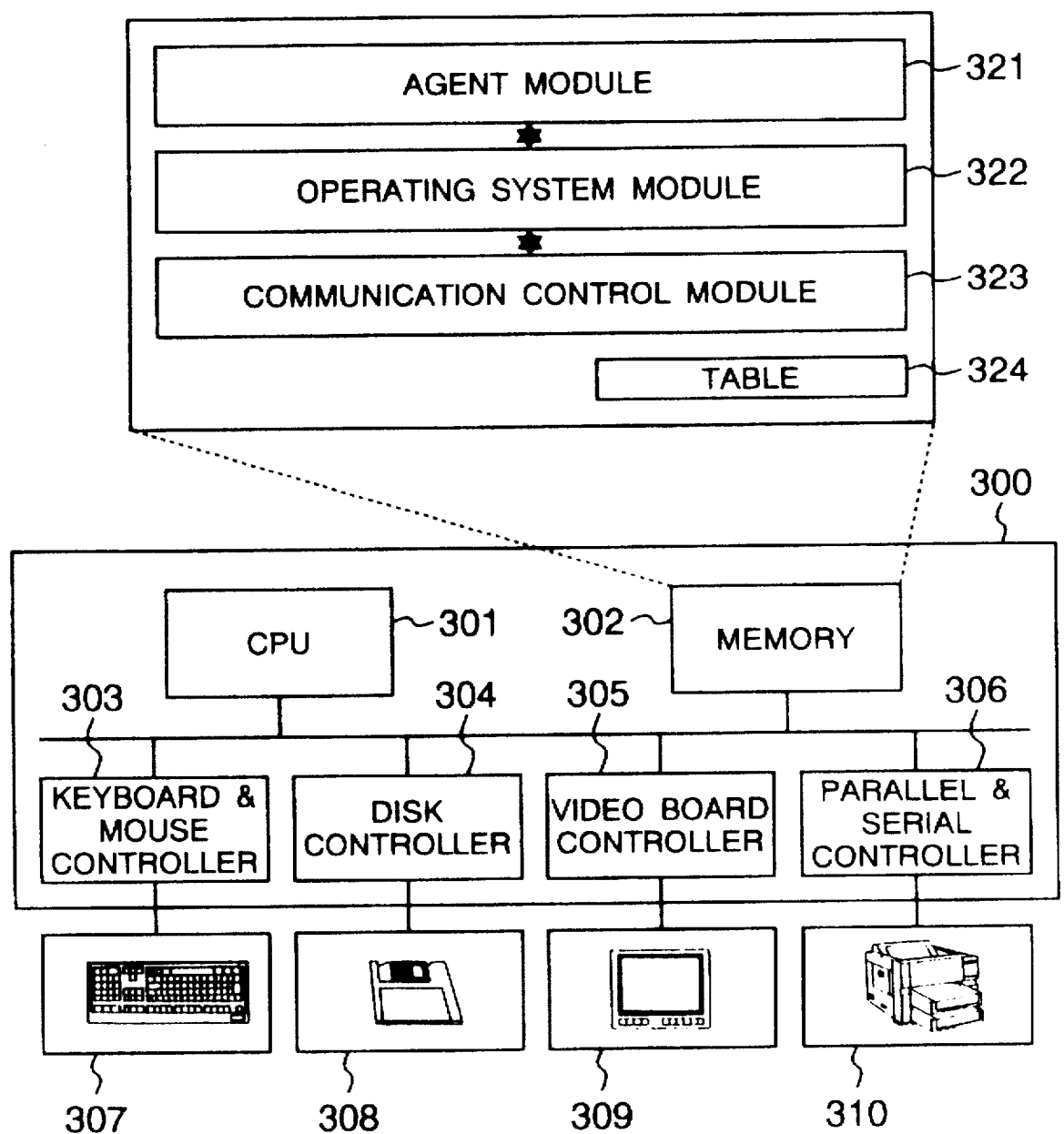
FIG. 4 is a block diagram showing an arrangement of an agent according to the embodiment of the present invention.

Each of the information components configuring the network includes the agent 300. FIG. 4 shows an arrangement of the agent 300.

As shown in FIG. 4, from a view of hardware, the agent 300 is composed of a normal computer and its associated external devices. The normal computer includes controllers 303 to 306 for controlling an input signal between the external devices and the computer itself, a CPU 301, and a memory 302. The external devices are an input unit 307 such as a keyboard or a mouse, an external storage unit 308 such as a floppy disk drive or a harddisk drive, a display unit 309, and a printer 310. The agent 300 also has a network interface, through which the agent 300 is connected to the network. The agent may be a system composed of some of those elements. For example, like the router, the display unit is not constantly necessary. Those component devices are not required to be dedicated to the agent. The information device to which the agent belongs shares the components for realizing the function with the agent.

The memory 302 includes an agent module 321, an operating system module 322, and a communication control module 323, which are executed under the control of the CPU 301. The memory also have a table 324 containing the address of the information device itself and the control information for the device. The format of the table 324 depends on each information device.

Figure 7:
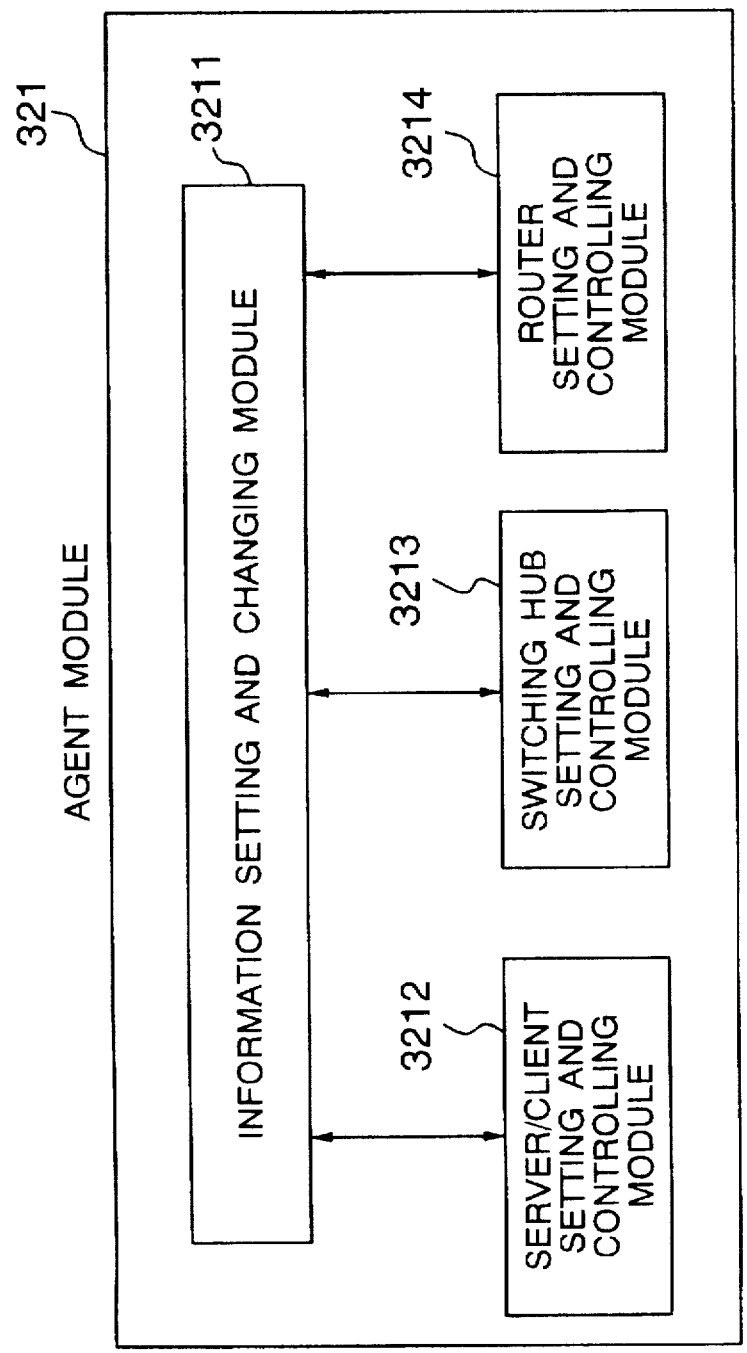
FIG. 7 is a block diagram showing an arrangement of an agent module according to the embodiment of the present invention.

Moreover, as shown in FIG. 7, the agent module 321 includes an information device setting and changing module 3211, a server/client setting and controlling module 3212, a switching hub setting and controlling module 3213, and a router setting and controlling module 3214. Further, one or more modules may be added to the agent module 321 if necessary. Conversely, the attribute of the information device to which the agent 300 belongs defines the modules to be used. By using this, the agent module 321 may be composed of only necessary modules to each information device.

The agent module 321 is started by an operators operation or a notice given by the physical manager. The information device setting and changing module 3211 receives the operation given by the operator or the notice sent from the physical manager 200. Depending on the attribute of the information device, the module 3211 selectively requests the server/client setting and controlling module 3212, the switching hub setting and controlling module 3213, or the router setting and controlling module 2214 to do the process. Each module operates to set and update the table 324.

Further, each module may control the setting or the operation of the corresponding information device in addition to the change of the table 324.

If the operator sets the items of the agent, the agent notifies the physical manager 200 of the changed content.

(5) Operation

Hereafter, the description will be oriented to the operations of the logical manager 100, the physical manager 200, and the agent 300.

At first, the summary of the operation will be described.

The system of this embodiment concerns with the network mainly configured of the switching networks, though it may contain the shared network. For example, if the change of the company organization causes relocation of the information devices connected to the network, the shared network needs to change its address on the network, while the switching network does not need it because it can define a logical network configuration. That is, conventionally, the network segment has depended on the physical location, while the use of the switching network makes it possible to define the network segment with the logical location.

The network segment termed herein means a broadcastable range or a subnet in the field of the TCP/IP protocol. Hence, the logical network configuration is made possible on the IP protocol level. Herein, each network segment is termed the "virtual network". This may hold true to the IP protocol as well as the other protocols. The virtual network secures a closed space, in which the security is obtained.

In the company organization, on the other hand, a personal reshuffle or change of a project causes frequent relocation of persons, and also of the information devices connected to the network. In particular, the information devices such as a personal computer and a workstation are often owned by their users. It means that the relocation of the users leads to the relocation of the information devices.

Under this condition, one important feature of the present invention will be described below with an example of a network used in the hierarchical organization.

The hierarchical organization such as a company is constituted so that an upper layer unit is made up of a set of lower layer units, concretely, an overall enterprise is made up of business offices, each business office is made up of departments, and each department is made up of sections. The virtual network is configured of layer units independently of the physical location such as geographical sites.

In the system of this embodiment, the hierarchical organization is built and managed by the directory service and the layer units configure the virtual network. The state of the virtual network is shown in FIG. 8.

Figure 8:
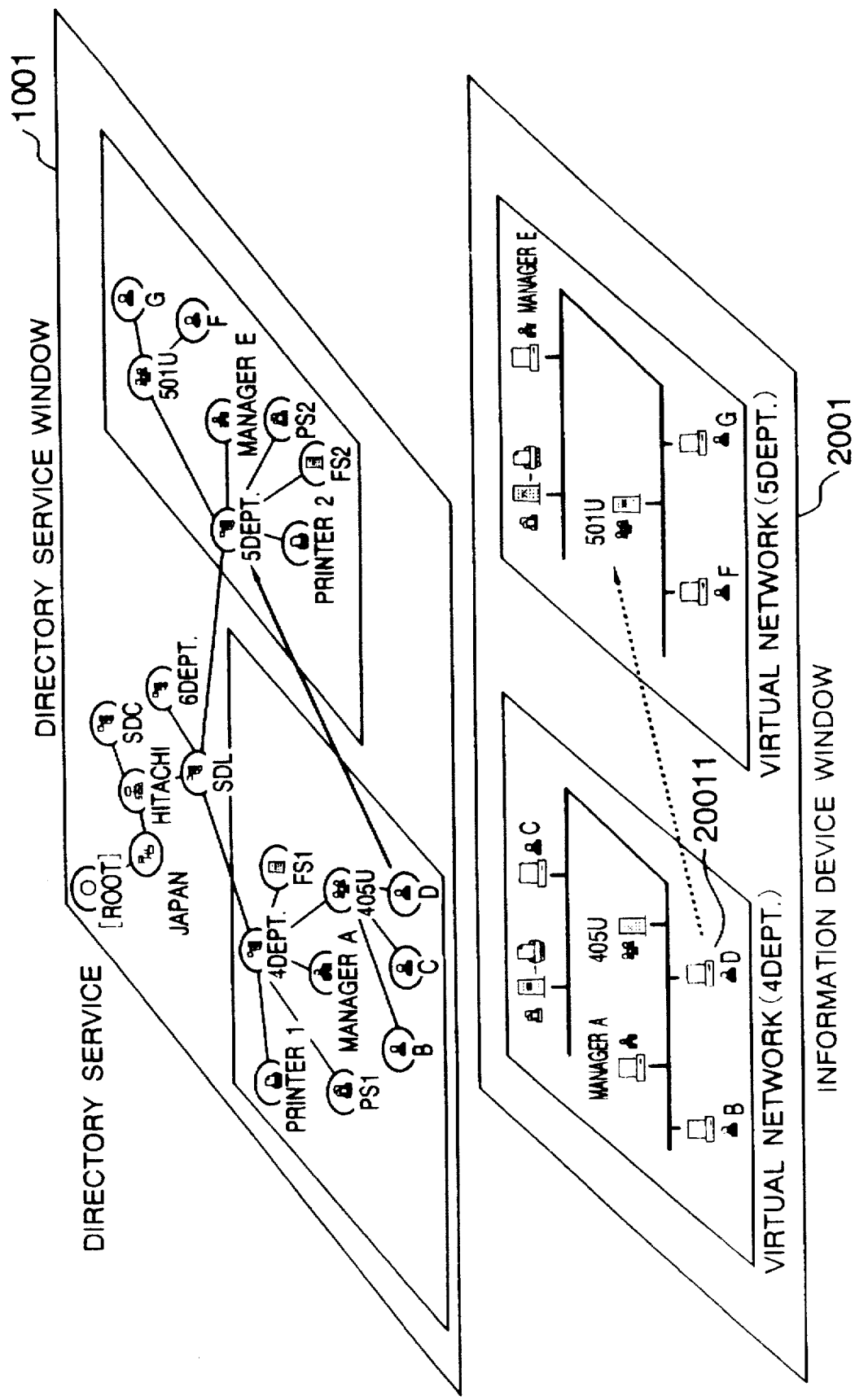
FIG. 8 is a view showing a directory service window and an information device window according to the embodiment of the present invention.

FIG. 8 shows a directory service window 1001 and an information device window 2001.

The directory service window 1001 representing the logical hierarchical structure of the organization and the information device window 2001 representing the virtual network are displayed on the display unit 109 of the logical manager 100 and the display unit 209 of the physical manager 200, respectively.

The directory service window 1001 configures the directory tree all over the world and represents the globe by root. Under the root, Japan is located. Under Japan, the company HITACHI is located. Further, under the Hitachi, the business offices of SDL and SDC are located. Under the business offices, the departments 4, 5, and 6 are located. The virtual network is configured of those department units. Under 4 department are located a department head, Manager A, a file server FS1, a print server PS1, and a printer Printer 1, these three of which are used in the department, and a section 405U. Under 405U, three users B, C, and D are located. Likewise, under 5 department are located a department head, Manager E, a file server FS2, a printer server PS2, and a printer Printer 2, these three of which are used in the department, and a section 405U. Under the section 501U, two users F and G are located.

The information device window 2001 represents the departments 4 and 5 with the virtual network. The virtual network. 4 Dept. and the virtual network. 5 Dept. correspond to the departments 4 and 5 of the directory service window 1001, respectively. Likewise, the elements of each department correspond to those of the directory service window 1001. Herein, the virtual network is represented on the assumption that each user has at least one information device.

For example, consider that the personal reshuffle causes a user "D" of the section 405U of the department 4 to move to the section 501U of the department 5.

The logical manager module 121 in the logical manager 100 is started by the operator so that the directory service window 1001 shown in FIG. 8 appears on the display unit. Then, the operator performs a drag & drop with a mouse so that the user "D" is moved from the sections 405U to 501U.

The logical manager module 121 operates to change the concerned record of the correspondence table of the logical object ID and the group name shown in FIG. 24A. Further, the logical manager module 121 operates to pick up all the physical objects IDs corresponding to the logical object ID "D" from the correspondence table of the physical object ID and the logical object ID and notify the physical manager 200 of the physical objects through the communication managing module 123.

In response to this notice, the physical manager module 221 in the physical manager 200 is started.

The physical manager modules contains a server/client setting-changing-managing module 2212 is served to change the virtual network in response to the relocation of the client 2001 of the user D, concretely, change the data of the physical object ID shown in FIG. 25 so that the client 2001 is moved from the Virtual Network (4 Dept.) to the other Virtual Network (5 Dept.).

Figure 9:
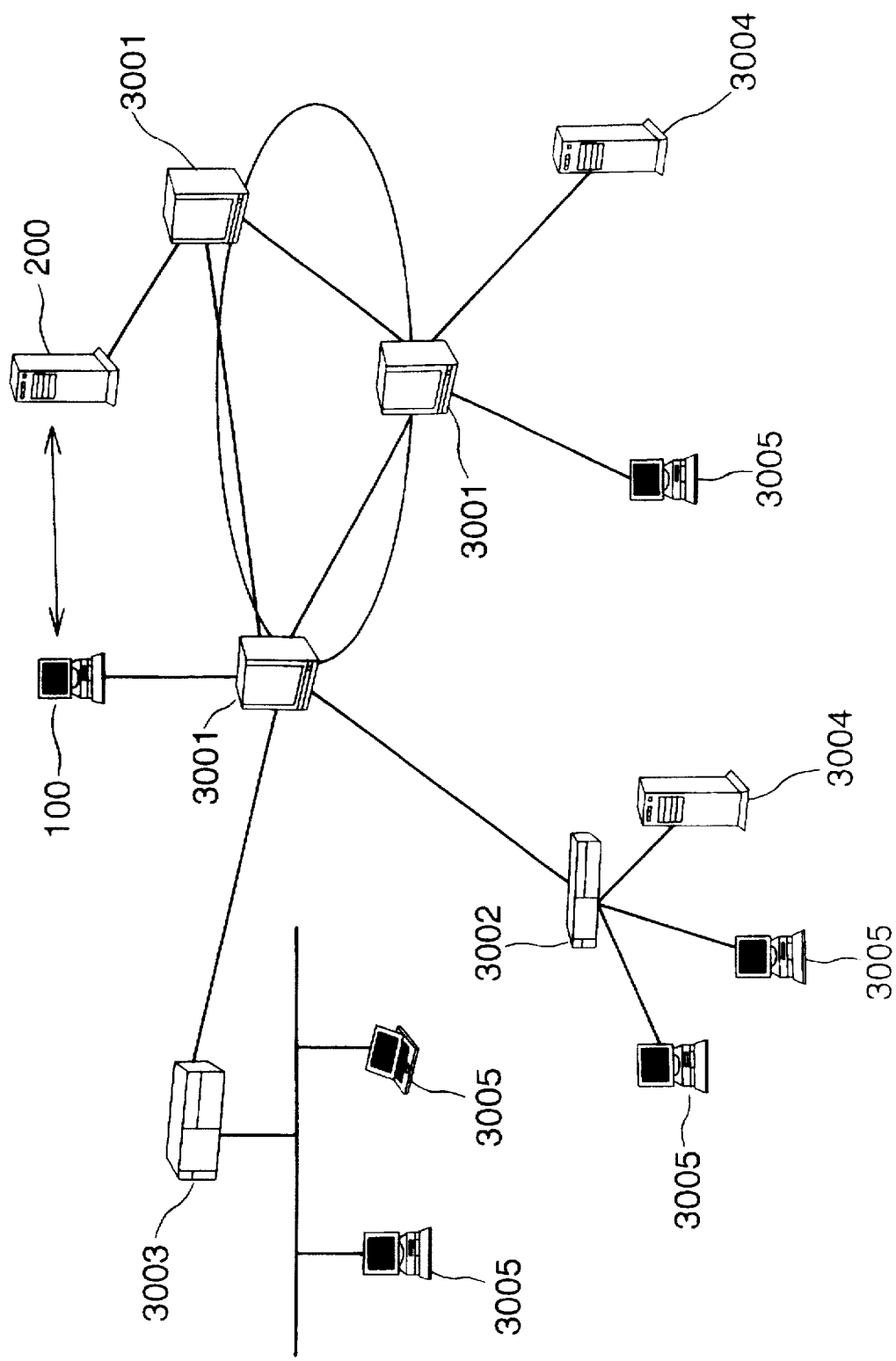
FIG. 9 is a view showing a relation between a logical manager and a physical manager according to the embodiment of the present invention.

The network shown in FIG. 9 is configured of the logical manager 100, the physical manager 200, ATMs (Asynchronous Transfer Mode) 3001, a switching hub 3002, a router 3003, servers 3004, clients 3005, and the like.

Figure 10:
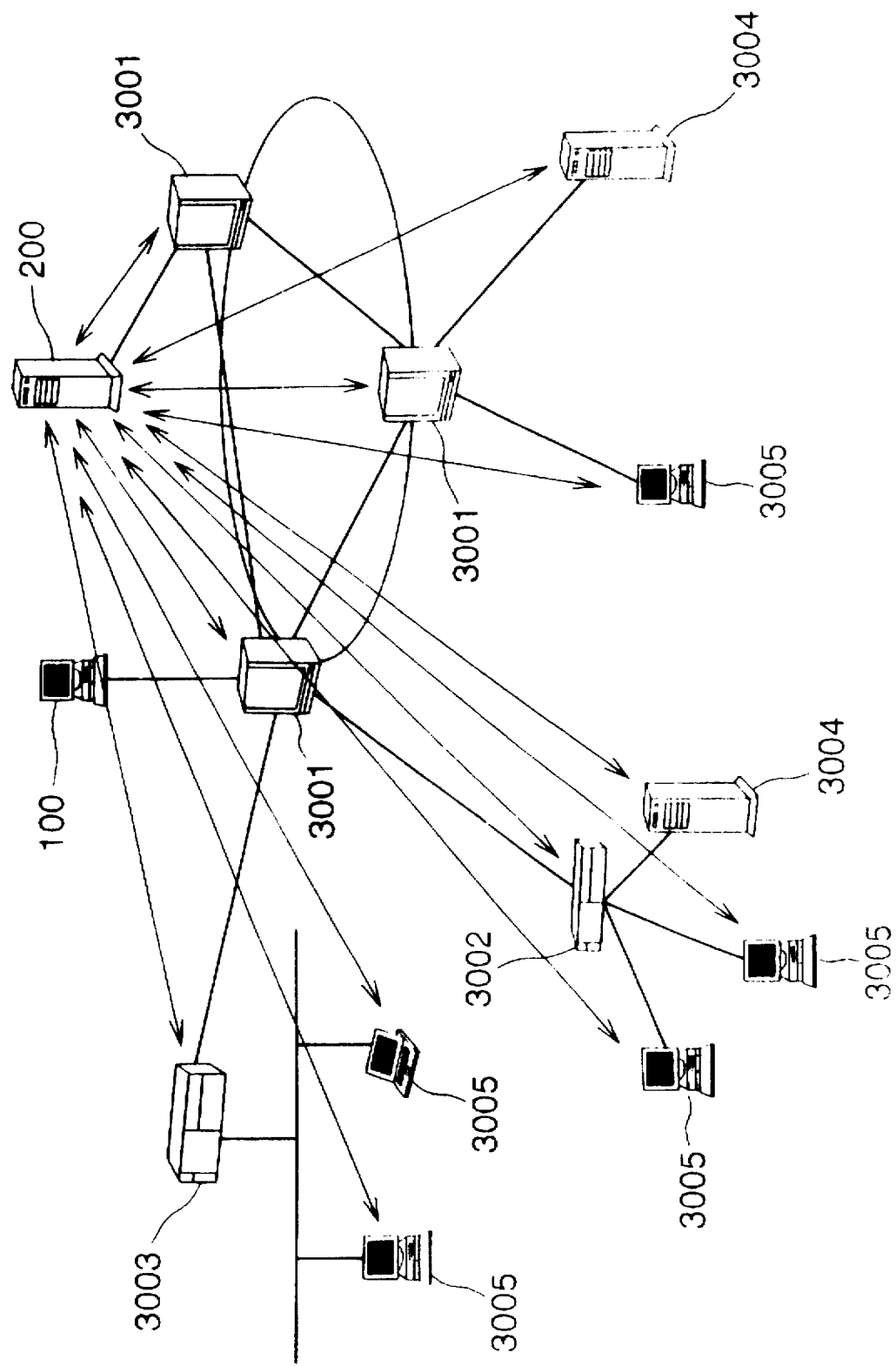
FIG. 10 is a view showing a relation between a physical manager and an agent according to the embodiment of the present invention.

As shown in FIG. 10, the physical manager module 221 is served to send the information about the change of the virtual network to the associated components of the network such as the ATMs 3001, the switching hub 3002, the router 3003, the servers 3004, and the clients 3005.

The information sent from the physical manager 200 serves to start the agent module 321 located inside of each component device.

In the servers 3004 and the clients 3005, the agent module 321 activates the server/client setting and controlling module 3212 to change the arrangement of the actual information device.

Likewise, in the switching hub 3002, the agent module 321 activates the switching hub setting and controlling module 3213 to change the arrangement of the switching hub.

Further, in the router 3003, the agent module 321 activates the router setting and controlling module 3214 to change the arrangement of the router.

(6) Configuration example of Virtual Network

In the foregoing description, each group which configures the virtual network is based on the company organization. It may be based on the security basis.

Figure 11:
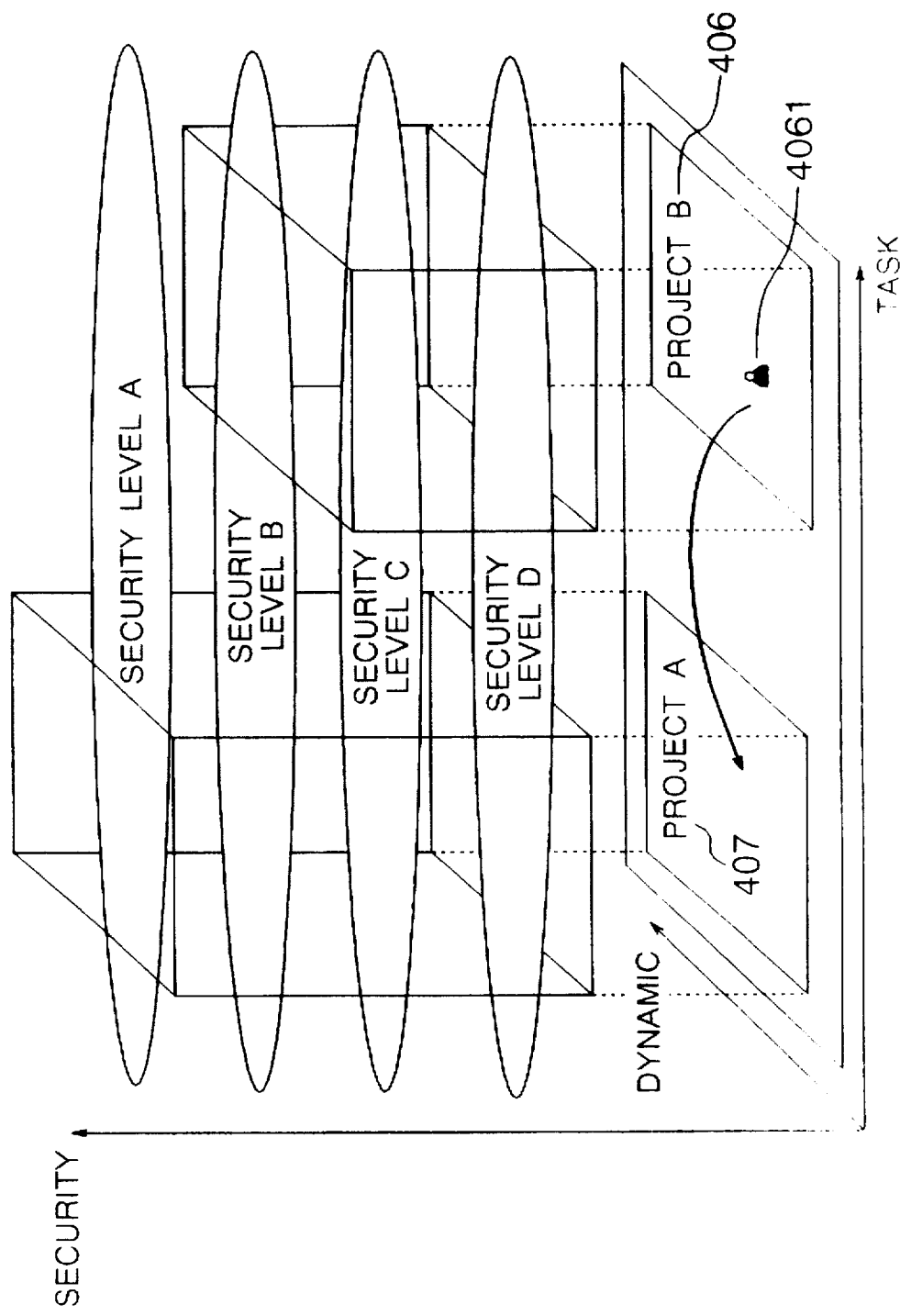
FIG. 11 is a view showing virtual networks grouped on a security level according to the embodiment of the present invention.

As shown in FIG. 11, the virtual network groups are Security Level A, Security Level B, Security Level C, and Security Level D. Project A407 belongs to the Security Level A, the Security Level B, the Security Level C, and the Security Level D. Project B406 belongs to the Security Level B, the Security Level C, and the Security Level D.

In this state, consider that a member 4061 of the project B 406 is relocated from the Project B to the Project A. Correspondingly, the security level of the information device used by the member 4061 is changed from the Security Level B, the Security Level C, and the Security Level D to the Security Level A, the Security Level B, the Security Level C, and the Security Level D.

Figure 12:
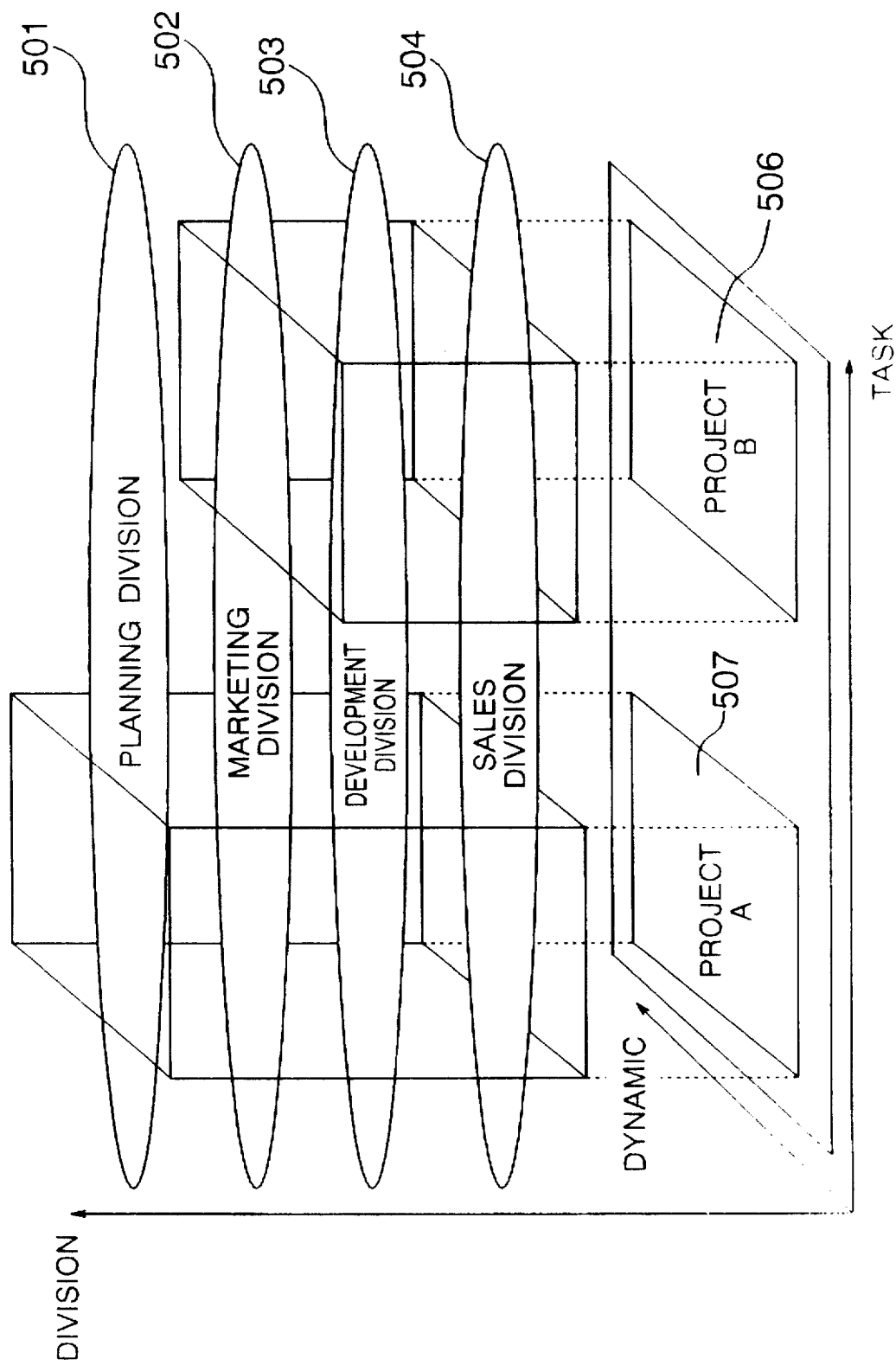
FIG. 12 is a view showing virtual networks grouped on a department level according to the embodiment of the present invention.

Further, as shown in FIG. 12, in place of configuring the virtual network on the security basis, the virtual network groups may be various divisions. That is, the virtual network groups are Planning Division 501, Marketing Division 502, Development Division 503, and Sales Division 504. Project A507 belongs to the Planning Division 501, the Marketing Division 502, the Development Division 503, and the Sales Division 504. Project B506 belongs to the Marketing Division 502, the Development Division 503, and the Sales Division 504.

Like the case of FIG. 11, the relocation of the member brings about the simultaneous and automatic change of the virtual network.

As described above, the factors on which each virtual network group is configured may be protocols or services in addition to the securities and the divisions.

Figure 13:
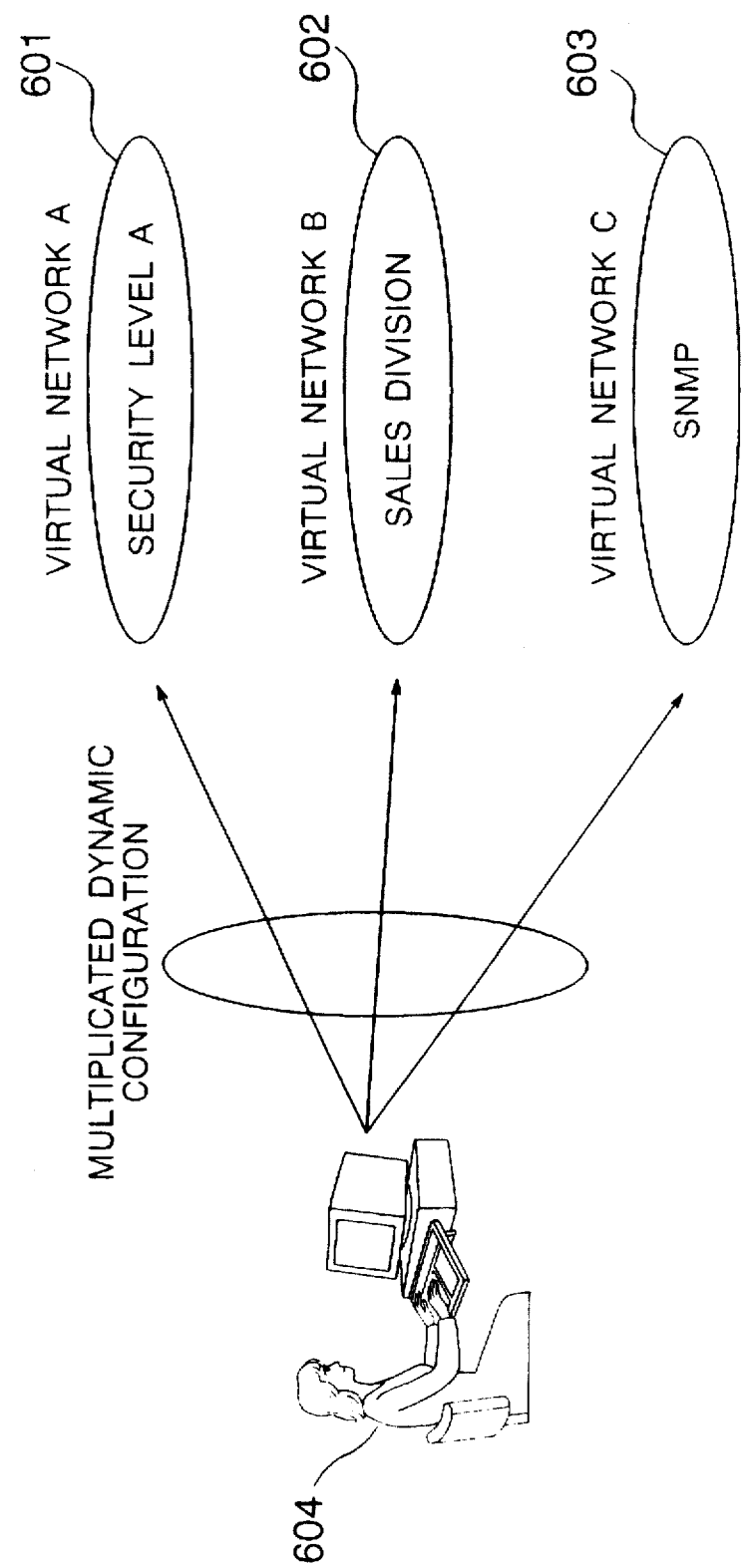
FIG. 13 is a view showing how the virtual networks are operated according to the embodiment of the present invention.

Moreover, the user may dynamically change the connections of the virtual networks for realizing the computer-network environment as shown in FIG. 13.

Concretely, the user 604 may dynamically or simultaneously connect to the Virtual Network A601 for the Security Level A, the Virtual Network B602 for the Sales Division, and the Virtual Network C603 for the SNMP (Simple Network Management Protocol) as necessary.

(7) Operation example

Figure 14:
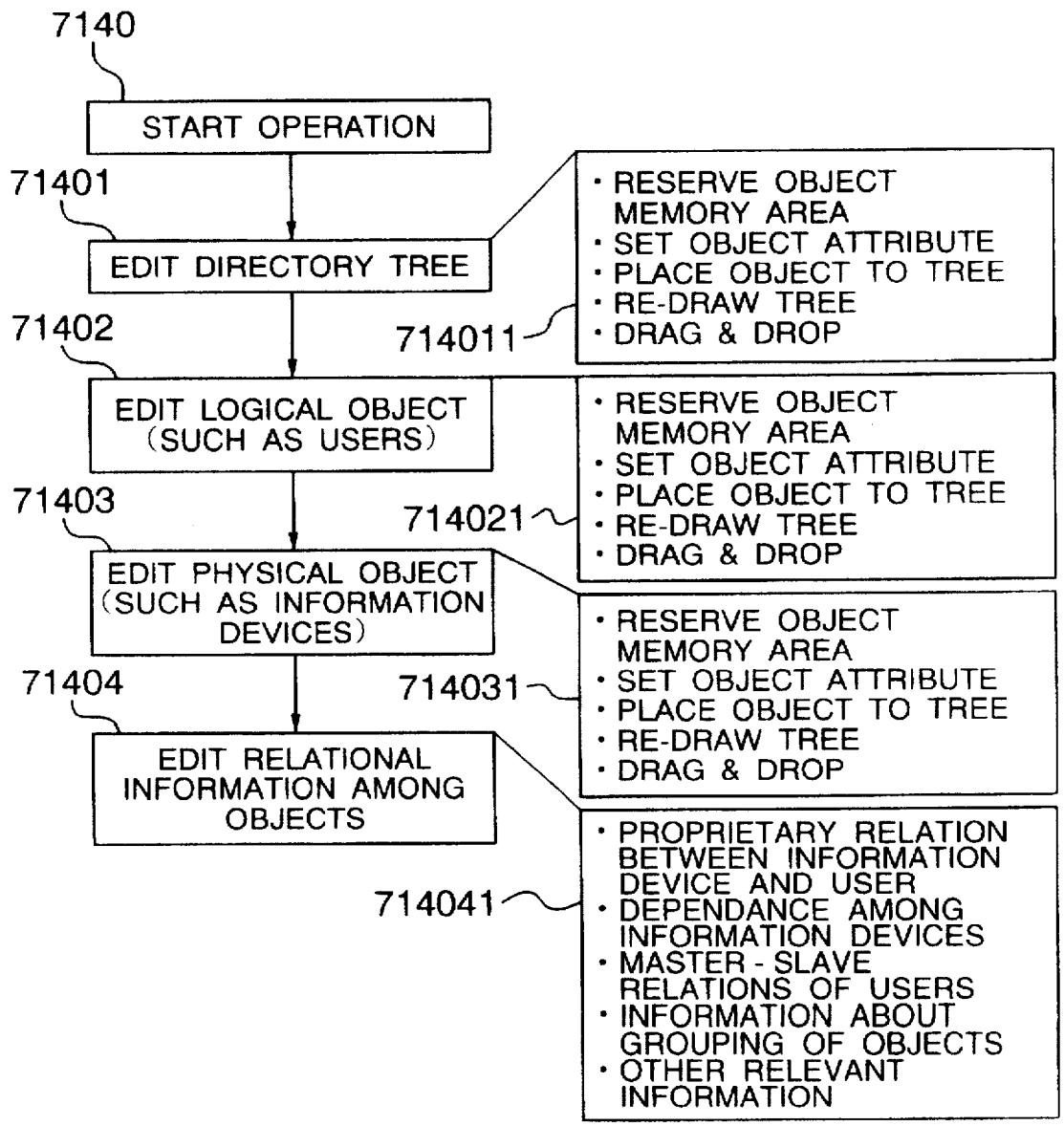
FIG. 14 is a flowchart showing a summary of users operation and process about software according to the embodiment of the present invention.

FIG. 14 is a flowchart showing an operating process executed by an operator and a summary of the process executed by the software according to the present invention. The actual operation of this software does not need to strictly follow the sequence of the flow as shown in FIG. 14. A part of the operating sequence may be reversed. Or, the repetition or the deletion of the part of the operating sequence is made possible.

At first, the operator of this program edits a directory tree structure at a step 71401. This editing operation contains creation, duplication, and deletion of a container object which is an element object of the tree-structure directory, change of attributes such as a title, and relocation of an object in the tree-structure. As illustrated in the block 714011, the process in this operation contains reserve of a memory area for saving information of the edited object, setting of an object attribute, drawing of the concerned object on a display, and a process for the users operation such as drag & drop. The process indicated in the block 714011 is executed by the directory setting module 1211 located in the logical manager module 121.

Next, the operator performs an editing operation 71402 of a logical object recorded and managed as electronic information on the directory service, such as a user, a group, or a file. Like the edition of the directory, this editing operation contains all operations about the logical object such as creation or duplication. Further, like the process indicated in the block 714011, this operation needs the process indicated in the block 714021. This process 714021 is executed by the user setting module 1213 located in the logical manager module 121 shown in FIG. 5.

In the directory structure, the file server, the client machine, the router, and the switch are also recorded and managed as electronic information on the directory service. Further, the necessity of setting the corresponding physical object like an information device causes the operator to edit the physical object at a step 71403. Like the edition of the directory, this editing operation contains all operations such as creation or duplication of the physical object. This editing operation needs the process indicated in the block 714031 like the process 714011. At a time, likewise, the setting information of the actual device is placed and recorded as electronic information on the directory service. The process indicated in the block 714031 is executed by the information device setting module 1214 located in the logical manager module 121.

Then, the operator performs an editing operation 71404 about the mutually associated information among the objects created and edited by the operations 71401 to 71403. The mutually associated information, termed herein, indicates how the set attributes of the objects have influence on the state of each object, such as master-slave relations, proprietary relations, dependent relations, and right relations like access authorization from one object to another.

Figure 15:
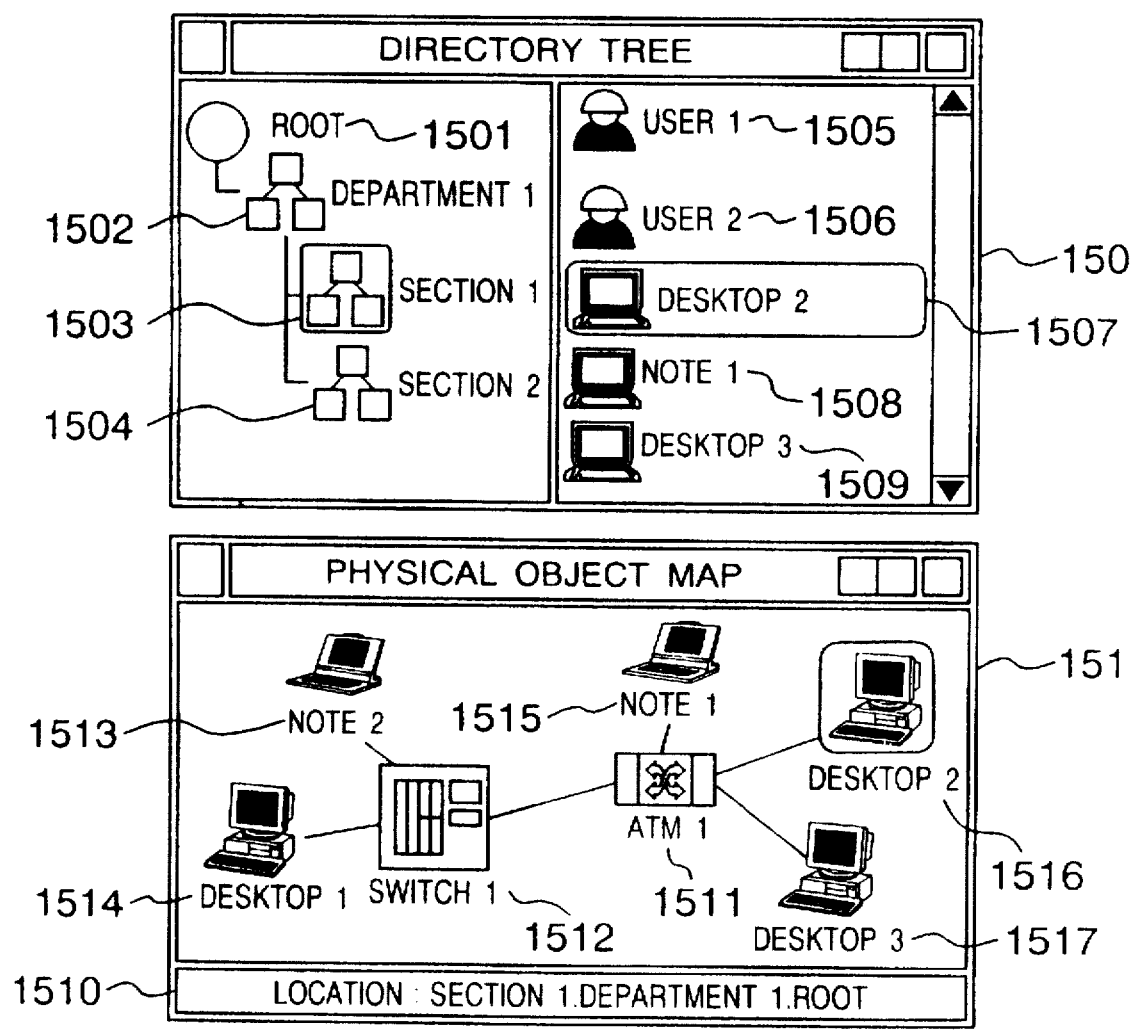
FIG. 15 is a view showing an example of a window operation view provided by the software according to the embodiment of the present invention.

FIG. 15 shows an operating window offered by the program of the invention, on which the operator performs the operation shown in FIG. 14. FIG. 15 shows a window 150 on which the directory service is operated (called the directory window) and the other window 151 on which only the physical objects are operated (called the physical window).

Of the objects displayed on the directory window 150, the objects 1501 to 1504 have a directory-tree structure, in which a root 1501 is a parent object. This structure indicates a virtual company organization in which Department 1 (1502), Section 1 (1503) and Section 2 (1504) of the organization are displayed. Besides, this directory may indicate a floor structure of a building. In this figure, Section 1 (1503) is an object selected on the screen by the user.

The objects 1505 to 1509 are logical and physical objects located inside of Section 1 (1503) object. User 1 (1505) and User 2 (1506) are user objects, which are the logical objects. Likewise, Desktop 2 (1507), Note 1 (1508), and Desktop 3 (1509) are objects for indicating personal computers, which are the physical objects. The viewport of those objects provides a scroll bar by which the content of the viewport can be scrolled. In this figure, Desktop 2 (1507) is an object selected on the screen by the user.

The physical window 151 is a window on which the information devices are represented by icons. On the window 151, there appear two devices through which the users computers are connected, ATM 1 (1511) and Switch 1 (1512), and some computers 1513 to 1517. In this figure, Desktop 2 appears on the directory window 150 and the physical window 151, as denoted by 1507 and 1516. They are the identical device. For identifying this device, it is possible to use an object identifier, a unique address used for communication such as ATM/MAC address, or unique data of the information device such as a device type and a manufacture number.

The physical object created on the physical window is allowed to be placed at a specific location on the directory by the suitable operation such as drag & drop. By performing the drag & drop operation of the user icon 1505 on the directory window, it is possible to set an owner and a manager of the physical object.

These operations for the window allow the logical and the physical objects to be located under the directory service so that various settings such as mutual relation are made possible.

Figure 16:
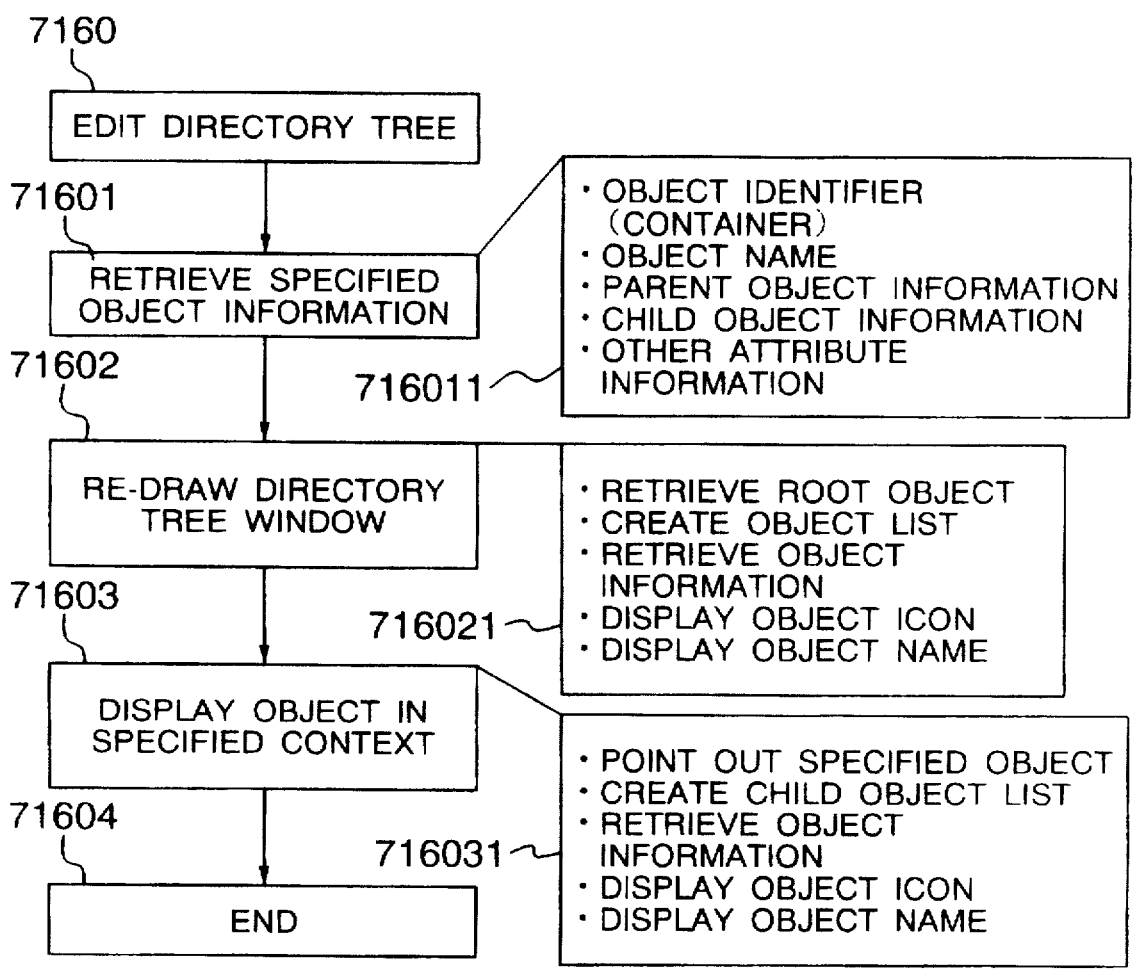
FIG. 16 is a flowchart showing an internal procedure for an operation of editing a directory tree contained in the software according to the embodiment of the present invention.

FIG. 16 is a flowchart showing an internal process of the operation indicated in the block 71401 shown in FIG. 14.

A process of retrieving information about the specified object indicated at a step 71601 is a process for identifying an object specified by the user, including creation of a new object. The information about the object to be retrieved is indicated in the block 716011. The information is various kinds of attributes used for identifying the specified object and defining the character of the object.

A process for re-drawing the directory window indicated at a step 71602 is a process for checking the mutual relations of all objects contained in the directory, creating information to display the tree-structure, and drawing the structured objects. As indicated in the block 716021, this re-drawing process takes the steps of creating a list for displaying the objects and defining the display sequence on the list. In place, it may take the steps of displaying the objects as retrieving them without creating the list.

A process for displaying the objects in the specified context indicated in the block 71603 is a process for specifying the user-pointed object in the tree, retrieving the content of a child object contained in the object, and displaying it on the window. Like the process 716021, this process is for creating the object-displaying list and defining the display sequence. These objects may be displayed without creating the list.

Figure 17:
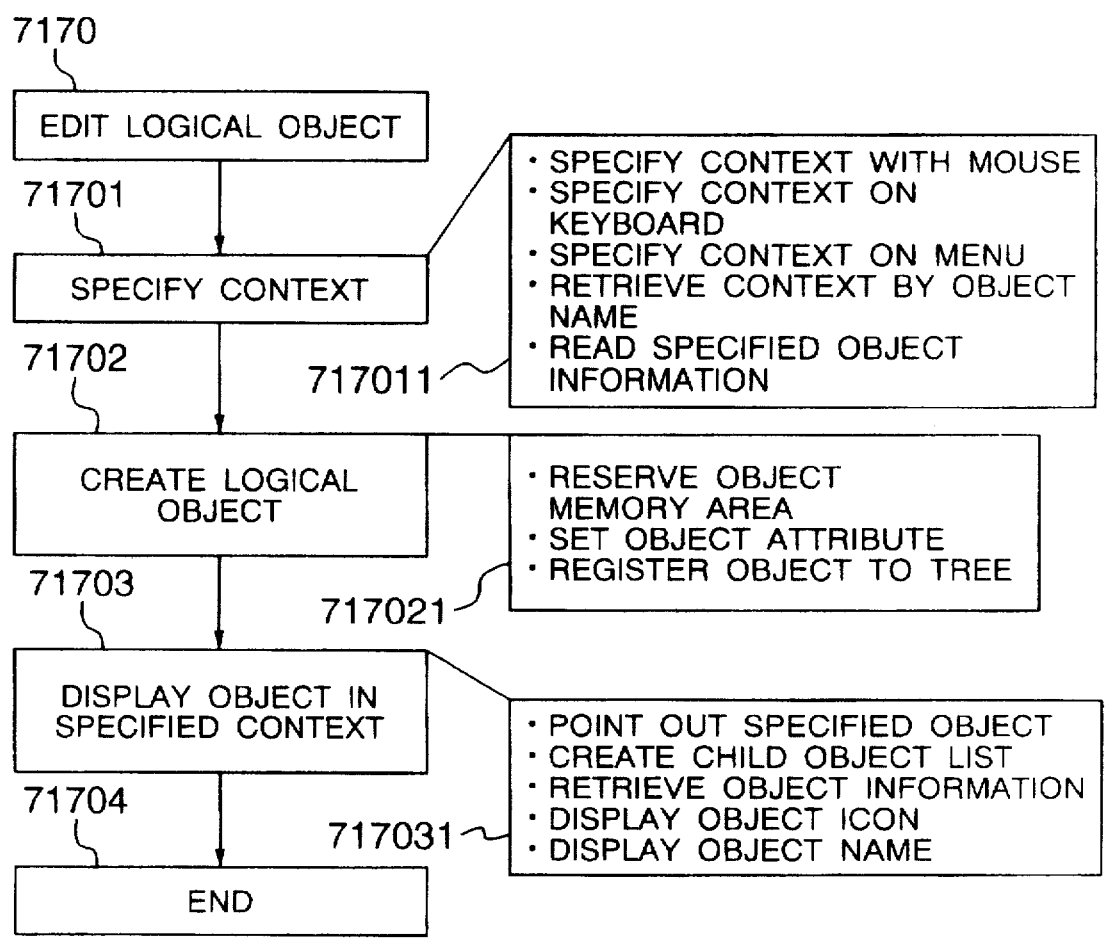
FIG. 17 is a flowchart showing an internal procedure for an operation of editing a logical object contained in the software according to the embodiment of the present invention.

FIG. 17 is a flowchart showing an internal process of the editing operation 71402 for the logical object shown in FIG. 14.

A process for specifying a context indicated at a step 71701 accepts the user's specification for specifying an object on the directory. As indicated in the block 717011, the process for specifying this context may be executed with the input unit such as a mouse or a keyboard or in combination with the retrieving processes.

A process for creating the logical object indicated in the block 71702 is basically a process for creating the logical object. This process contains a process for operating the existing object. If the operation for the existing object is specified, in the processes indicated in the block 717021, only the process for setting the object attribute is executed. If the relocation of the object is specified, only the process for placing it in the tree is executed.

A process for displaying an object indicated in the block 71703 is executed to display the created and edited object on the window. The displaying process is substantially analogous to the displaying process indicated in the block 71603.

Figure 18:
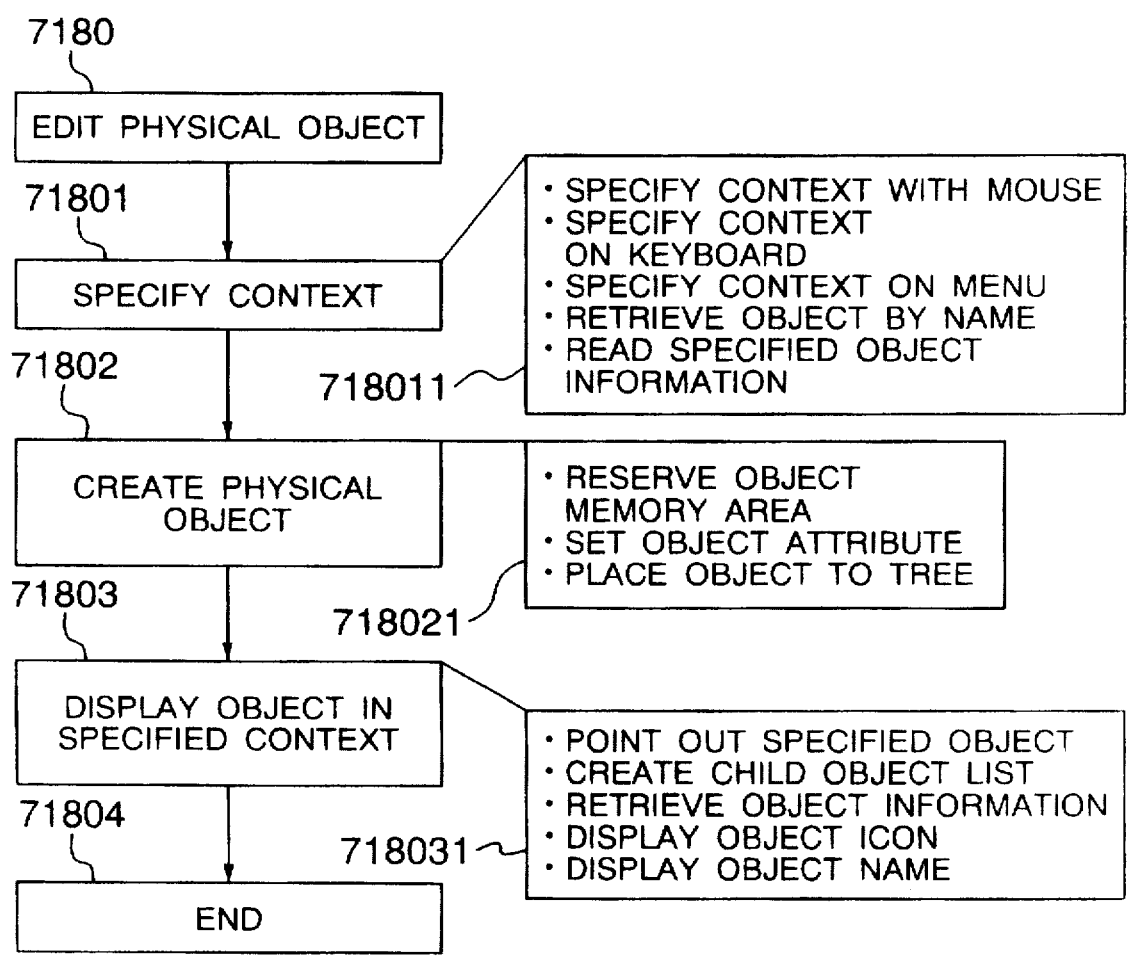
FIG. 18 is a flowchart showing an internal procedure for an operation of editing a physical object contained in the software according to the embodiment of the present invention.

FIG. 18 is a flowchart showing an internal process of the editing operation 71402 for the physical object shown in FIG. 14.

The flow and the content of this process is likewise to the process about the logical object shown in FIG. 17, except that the object attributes to be set to the object have to contain the information such as an identifier for specifying the corresponding information device.

Figure 19:
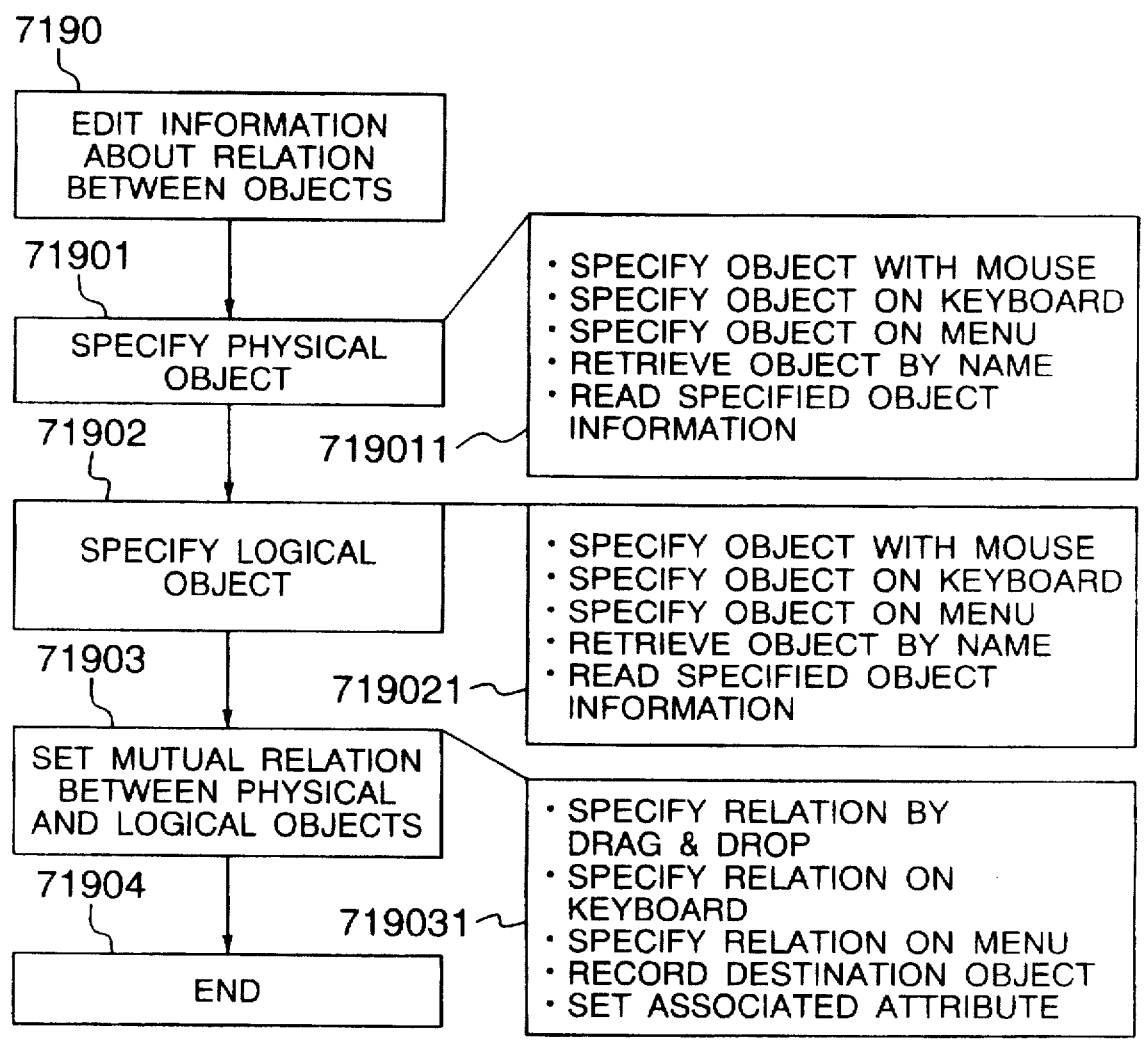
FIG. 19 is a flowchart showing an internal procedure for an operation of editing relational information among objects contained in the software according to the embodiment of the present invention.

FIG. 19 is a flowchart showing an internal process of the editing operation 71404 about the relational information among the objects shown in FIG. 14.

The flow of the process shown in FIG. 19 will be described on the assumption that the mutual relation between User 1 object 1505 of the directory window shown 150 in FIG. 15 and Desktop 2 object 1516 of the physical window 151 is set to "Own" (proprietary). The process for specifying the physical object indicated at a step 71901 includes specifying Desktop 2 object in the window 151 by the users operation 719011 with the input unit like the mouse. Likewise, a process for specifying the logical object indicated at a step 719021 includes specifying User 1 object 71506 by the user's operation 719021 with the input unit like the mouse. About the specified objects, the specific operation with the input unit like the mouse allows the relation of "Own" to be set. The process for setting the relation between the objects is for setting the reference information for allowing the objects the mutual reference and for setting the attribute of each object for indicating the reference content (indicated in the block 719031). The series of process 719031 makes the relation between the physical and the logical objects obvious and it possible to reflect the operation of the logical object on the directory service on the setting state of the information device, according to the relation between the physical object and the information device.

Figure 20:
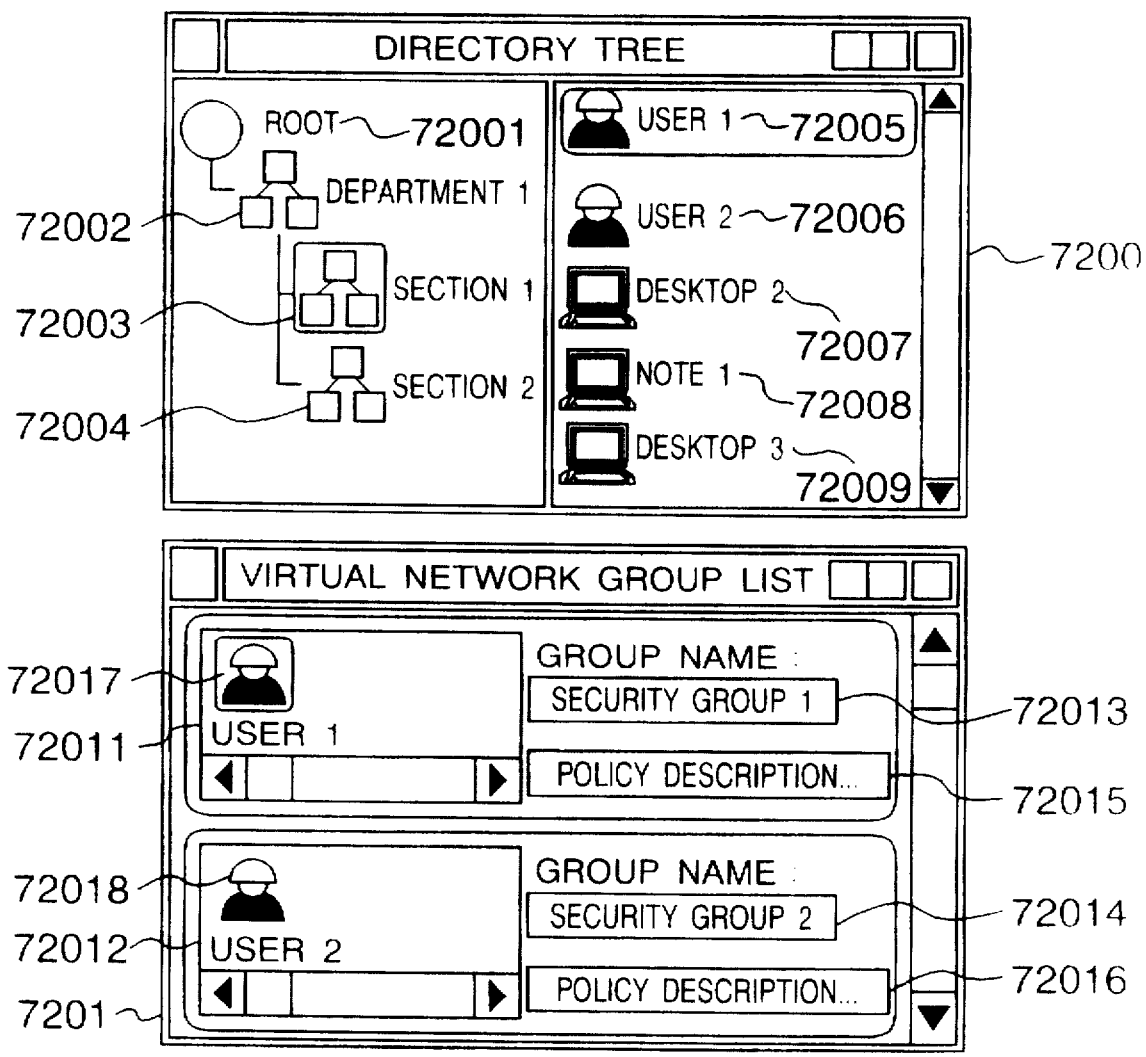
FIG. 20 is a view showing an internal procedure for an operation of editing relational information among objects contained in the software according to the embodiment of the present invention.

FIG. 20 is a view showing a setting window screen on which the object on the directory service are placed in the virtual network group.

A Directory Tree window 7200 is the same as the window 7150 shown in FIG. 15. A Virtual Network Group List window 7201 is a window for displaying plural virtual networks and their members. For example, the virtual network groups based on the security level as shown in FIG. 11 may be represented as Security Group 1, Security Group 2, and so forth. This window contains icon areas 72011 and 72012, areas 72013 and 72014, and Policy Description buttons 72013 and 72014. The icon areas 72011 and 72012 indicate the states of the logical objects such as the users, for example, which are built into virtual networks from the Directory Tree window 7200 by the operation such as the drag & drop. The areas 72013 and 72014 display the names of the virtual network groups. The policy Description buttons 72015 and 72016 are pressed to set the grouping rules of each group. Each display area provides a scroll bar so that the displayed content may be scrolled.

The arrangement shown in FIG. 20 indicates that the User 1 is placed into the Security Group 1 by dragging and dropping User 1 (72005) to the icon area 72011 of Security Group 1.

Figure 21:
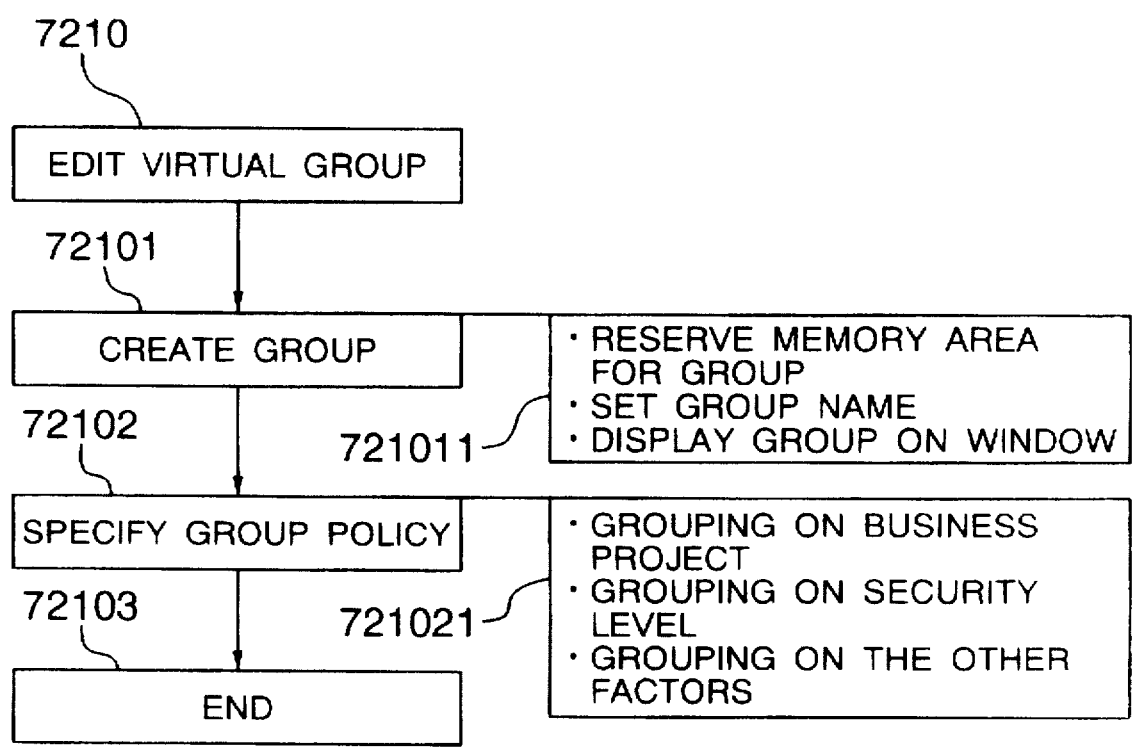
FIG. 21 is a flowchart showing an internal procedure for an operation of editing relational information among objects contained in the software according to the embodiment of the present invention.

FIG. 21 is a flowchart showing an operation and a process of editing the virtual network group. At first, at a step 72101, a network group is created by the operator. This process reserves a memory area for the virtual network group, set a group name, and display it (as indicated in the block 721011). Then, at a step 72102, a classifying attribute is set as a group policy to the virtual network group. The group policy termed herein means, for example, the departments of the company organization or the security level based on which the virtual network group is created as mentioned above. Since the network groups may be created based on the different group policies, the different group policies may be treated as the same level.

Figure 22:
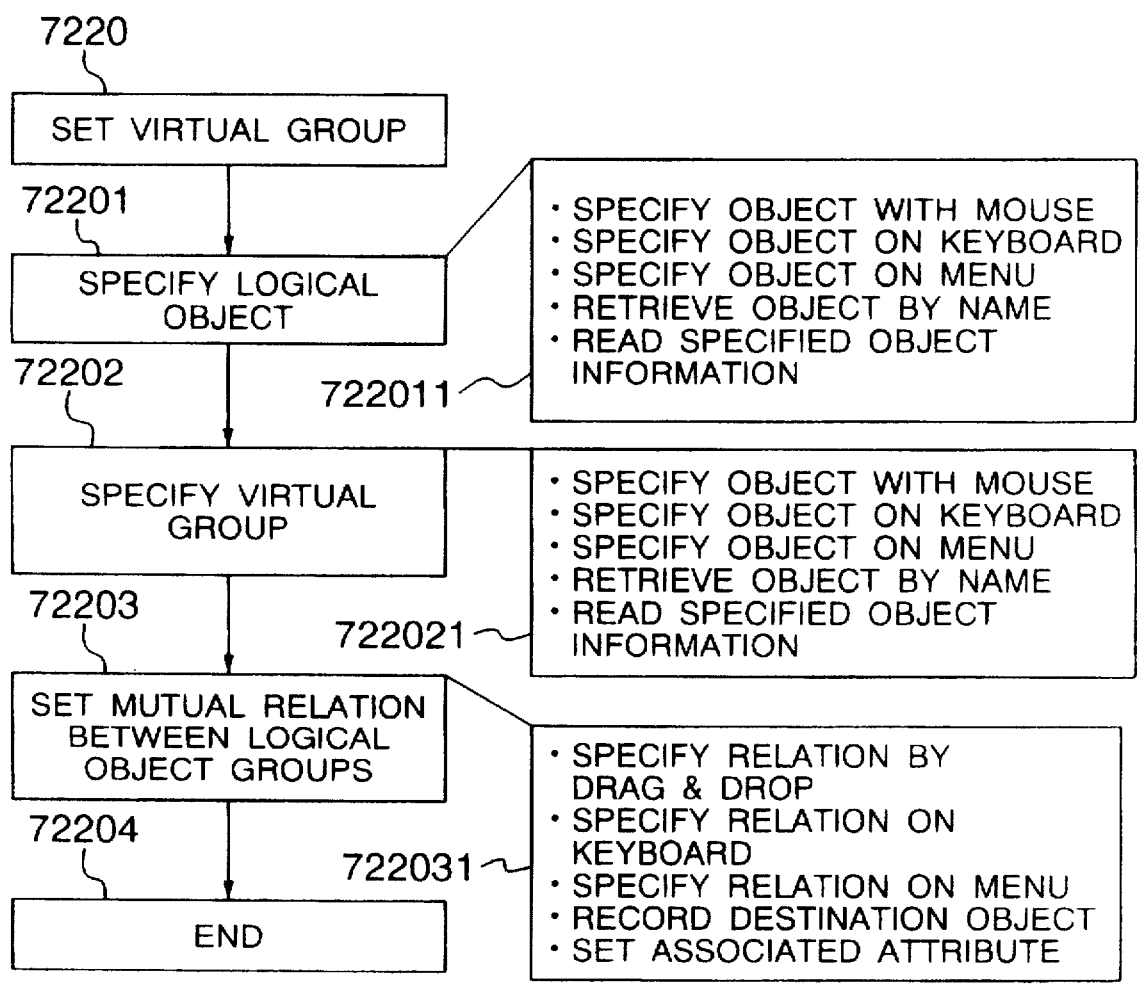
FIG. 22 is a flowchart showing an internal procedure for an operation of editing relational information among objects contained in the software according to the embodiment of the present invention.

FIG. 22 is a flowchart showing an operation and a process for allocating users and the like to the virtual network group created by the process 7210. This process is executed on the assumption that each virtual network group itself is an object. Hence, this process can be done similarly with the process 7190 which is setting the relation among the objects. That is, by specifying the logical object (72201) and the virtual network group (72202), the object is identified. By setting the associated attributes, that is, mutual reference between the logical object and the virtual network group object and definition of each member of the network, the logical object is allowed to belong to the virtual network group.

Figure 23:
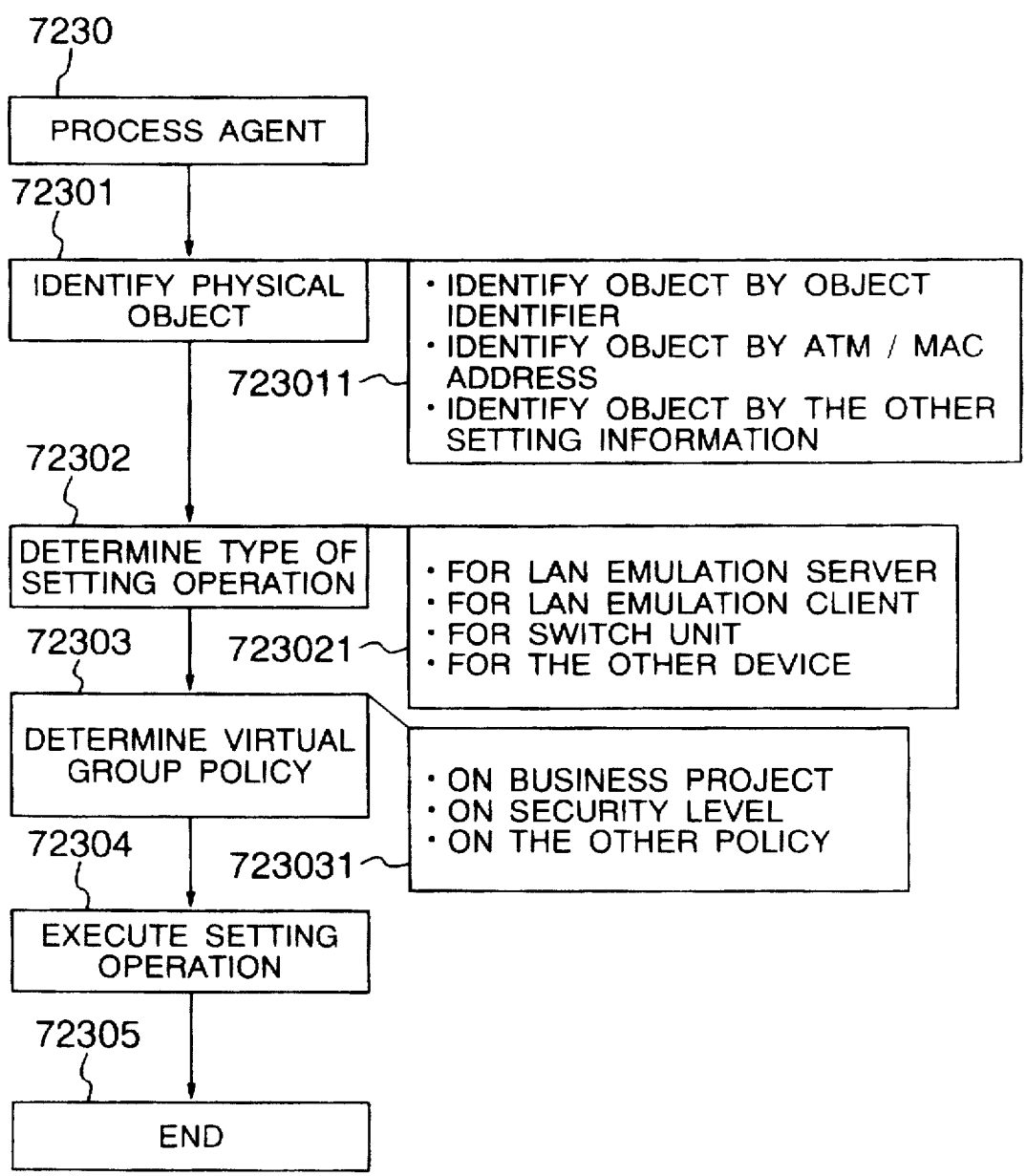
FIG. 23 is a flowchart showing an internal procedure for an operation of editing relational information among objects contained in the software according to the embodiment of the present invention.

FIG. 23 is a flowchart showing a summary of a process executed by the agent module 321. The agent module 321 performs the setting operation of each information device in accordance with the directory information set by the logical manager module 121 and transmitted through the physical manager. At first, the agent module checks if the setting information of the device managed by the agent module itself is recorded as an object on the directory service and, if it is, obtains the information set on the directory service (step 72301). Next, the agent module determined which of the pre-set operations is to be selected based on the obtained setting information (step 72303). This determination is allowed to be classified by the features of the service and the device, as indicated in the step 7230, for example. Further, the agent module checks the policy of the virtual network group, determines the group where the information device is to be actually incorporated (step 72303), and performs the actual setting operation (step 72304). For example, if LAN Emulation Client will be incorporated into a group of the security level A, the agent module writes ATM address of LAN Emulation Server for managing the group of the security level A to the setting file of LAN Emulation Client.

We claim:

1. A network operation/management system, for managing logical objects that are logical components of a network and physical objects that are physical components of the network, comprising:

a logical manager, connected to said network, for managing said logical objects and relations between said logical objects;

a physical manager, connected to said network, for managing the physical objects corresponding to said logical objects and relations between said physical objects;

agents for controlling settings of said physical objects on said physical objects, respectively; and wherein said logical manager includes means for notifying said physical manager of a changed content when a change takes place in the relation between said logical objects managed by said logical manager, said physical manager includes means for updating the relation between said physical objects managed by said physical manager in conformity with the changed content notified by said logical manager and the correspondence between said logical objects and physical objects and for requesting said agents to change the settings of physical objects in a manner to match to the updated relation between said physical objects, and each of said agents changes the settings of each physical object in response to the request from said physical manager.

2. A network operation/management system as claimed in claim 1, wherein said physical manager includes:

means for managing a virtual network representing logical relation between said physical objects; and means for updating said virtual network to be managed in a manner to match to said changed relation between said logical objects in conformity with the changed content notified by said logical manager and the correspondence between said logical object and said physical object.

3. A network operation/management system as claimed in claim 1, wherein said logical manager is arranged to manage the relation between said logical objects as a directory for hierarchically representing said relation.

4. A network operation/management system, for managing logical objects that are logical components of a network and physical objects that are physical components of the network, comprising:

a logical manager for managing relation between said logical objects;

a physical manager for managing a virtual network corresponding to said logical object group, said virtual network representing logical relation between said physical objects corresponding to said logical objects; and wherein said logical manager includes means for notifying said physical manager of the changed content when any change takes place in the relation between said logical objects managed by said logical manager, and said physical manager includes means for updating said virtual network managed by said physical manager to match to the changed relation between said logical objects in conformity with the changed content notified by said logical manager, the correspondence between said logical and physical objects, and the correspondence between said logical objects and said virtual network.

5. A network operation/management method, for managing logical objects that are logical components of a network and physical objects that are physical components of the network, comprising the steps of:

providing a logical manager, connected to said network, for managing relation between said logical objects;

providing a physical manager, connected to a network, for managing the physical objects corresponding to said logical objects and relation between the physical objects;

providing agents for controlling settings of said physical objects to said physical objects, respectively;

inputting a change of the relation between said logical objects to said logical manager by an operator;

notifying content of the relation between said logical objects changed by said logical manager to said physical manager;

updating by said physical manager relation between said physical objects managed by said physical manager to match to the changed relation between said logical objects in conformity with the changed content notified by said logical manager and the correspondence between said logical objects and physical objects and requesting said agents to change the settings of said physical objects in a manner to match to the updated relation between said physical objects; and changing the settings of said physical object by respective agents in response to the request given by said physical manager.

6. A computer program product stored on a storage medium, for managing logical objects that are logical components of a network and physical objects that are physical components of a network, said computer program product comprising:

a logical manager program for managing relation between said logical objects and notifying a physical manager program of a changed content when any change takes place in the relation between said logical objects managed by said logical manager program;

a physical manager program for managing the physical objects corresponding to said logical objects and the relation between said physical objects, updating the relation between said physical objects managed by said physical manager program in a manner to match to the changed relation between said logical objects in conformity with the changed content notified by said logical manager program and the correspondence between said logical object and said physical object, and requesting said agents to change the settings of physical objects in a manner to match to the updated relation between said physical objects; and an agent program for controlling the settings of each physical object and changing the settings of said physical object in response to the request given by said physical manager program.

7. A computer program according to claim 6, wherein said storage medium is provided by a server that distributes said program to computers connected to a network.

* * * * *